(12) United States Patent
Solanki et al.

(10) Patent No.: US 7,996,331 B1
(45) Date of Patent: Aug. 9, 2011

(54) COMPUTER-IMPLEMENTED SYSTEMS AND METHODS FOR PERFORMING PRICING ANALYSIS

(75) Inventors: Rajendra Singh Solanki, Cary, NC (US); Yinhua Wang, Cary, NC (US); Jie Zhong, Raleigh, NC (US); Hao Cheng, Athens, GA (US)

(73) Assignee: SAS Institute Inc., Cary, NC (US)

( * ) Notice: Subject to any disclaimer, the term of this patent is extended or adjusted under 35 U.S.C. 154(b) by 831 days.

(21) Appl. No.: 11/848,636

(22) Filed: Aug. 31, 2007

(51) Int. Cl.
 *G06Q 99/00* (2006.01)
(52) U.S. Cl. .................. 705/400; 705/1.1; 705/7.31
(58) Field of Classification Search ............. 705/1.1, 705/7, 10, 400, 7.31
See application file for complete search history.

(56) References Cited

U.S. PATENT DOCUMENTS

| | | | |
|---|---|---|---|
| 5,195,172 A * | 3/1993 | Elad et al. ............. 706/62 |
| 6,023,684 A | 2/2000 | Pearson |
| 6,175,876 B1 | 1/2001 | Branson et al. |
| 6,226,623 B1 | 5/2001 | Schein et al. |
| 6,263,315 B1 | 7/2001 | Talluri |
| 6,553,352 B2 * | 4/2003 | Delurgio et al. .......... 705/400 |
| 6,907,382 B2 | 6/2005 | Urokohara |
| 6,970,830 B1 | 11/2005 | Samra et al. |
| 7,039,594 B1 | 5/2006 | Gersting |
| 7,085,734 B2 | 8/2006 | Grant et al. |
| 7,089,266 B2 | 8/2006 | Stolte et al. |
| 7,092,896 B2 | 8/2006 | Delurgio et al. |
| 7,092,929 B1 | 8/2006 | Dvorak et al. |
| 7,130,811 B1 | 10/2006 | Delurgio et al. |
| 7,133,876 B2 | 11/2006 | Roussopoulos et al. |
| 7,133,882 B1 | 11/2006 | Pringle et al. |
| 7,240,019 B2 | 7/2007 | Delurgio et al. |
| 7,249,031 B2 | 7/2007 | Close et al. |
| 7,251,615 B2 | 7/2007 | Woo |
| 7,302,400 B2 | 11/2007 | Greenstein |
| 7,302,410 B1 | 11/2007 | Venkatraman et al. |
| 7,346,538 B2 | 3/2008 | Reardon |
| 7,370,366 B2 | 5/2008 | Lacan et al. |
| 7,379,890 B2 | 5/2008 | Myr et al. |
| 7,440,903 B2 | 10/2008 | Riley et al. |
| 7,536,361 B2 | 5/2009 | Alberti et al. |
| 7,617,119 B1 * | 11/2009 | Neal et al. ............... 705/7.35 |
| 7,689,456 B2 | 3/2010 | Schroeder et al. |
| 2002/0013757 A1 | 1/2002 | Bykowsky et al. |
| 2002/0046096 A1 | 4/2002 | Srinivasan et al. |

(Continued)

FOREIGN PATENT DOCUMENTS

EP 1413955 4/2004

(Continued)

OTHER PUBLICATIONS

Armstrong, Mark; "Multiproduct Nonlinear Pricing", Jan. 1996, Econometrica, vol. 64, No. 1, pp. 51-75; 26 pgs.*

(Continued)

*Primary Examiner* — John Hayes
*Assistant Examiner* — Freda A Nelson
(74) *Attorney, Agent, or Firm* — Jones Day

(57) ABSTRACT

Computer-implemented systems and methods for regular pricing optimization. A system can include decomposing a pricing situation into sub-problems. A non-linear optimization problem is solved to determine continuous optimal prices. A mixed integer linear programming problem is solved to snap prices to grid points.

18 Claims, 19 Drawing Sheets

U.S. PATENT DOCUMENTS

| | | |
|---|---|---|
| 2002/0072953 A1 | 6/2002 | Michlowitz et al. |
| 2002/0099678 A1 | 7/2002 | Albright et al. |
| 2002/0107723 A1 | 8/2002 | Benjamin et al. |
| 2002/0116237 A1 | 8/2002 | Cohen et al. |
| 2002/0123930 A1 | 9/2002 | Boyd et al. |
| 2002/0169654 A1 | 11/2002 | Santos et al. |
| 2002/0169655 A1 | 11/2002 | Beyer et al. |
| 2002/0178049 A1 | 11/2002 | Bye |
| 2003/0023598 A1 | 1/2003 | Janakiraman et al. |
| 2003/0028437 A1 | 2/2003 | Grant et al. |
| 2003/0050845 A1 | 3/2003 | Hoffman et al. |
| 2003/0078830 A1 | 4/2003 | Wagner et al. |
| 2003/0083924 A1 | 5/2003 | Lee et al. |
| 2003/0083925 A1 | 5/2003 | Weaver et al. |
| 2003/0088458 A1 | 5/2003 | Afeyan et al. |
| 2003/0097292 A1 | 5/2003 | Chen et al. |
| 2003/0110072 A1 | 6/2003 | Delurgio et al. |
| 2003/0110080 A1 | 6/2003 | Tsutani et al. |
| 2003/0120584 A1 | 6/2003 | Zarefoss et al. |
| 2003/0126010 A1 | 7/2003 | Barns-Slavin |
| 2003/0126136 A1 | 7/2003 | Omoigui |
| 2003/0172145 A1 | 9/2003 | Nguyen |
| 2003/0208402 A1 | 11/2003 | Bibelnieks et al. |
| 2003/0208420 A1 | 11/2003 | Kansal |
| 2003/0220830 A1 | 11/2003 | Myr |
| 2003/0229502 A1 | 12/2003 | Woo |
| 2003/0236721 A1 | 12/2003 | Plumer et al. |
| 2004/0093296 A1 | 5/2004 | Phelan et al. |
| 2004/0111388 A1 | 6/2004 | Boiscuvier et al. |
| 2004/0199781 A1 | 10/2004 | Erickson et al. |
| 2005/0033761 A1 | 2/2005 | Guttman et al. |
| 2005/0066277 A1 | 3/2005 | Leah et al. |
| 2005/0096963 A1 | 5/2005 | Myr et al. |
| 2005/0194431 A1 | 9/2005 | Fees et al. |
| 2005/0197896 A1 | 9/2005 | Viet et al. |
| 2005/0198121 A1 | 9/2005 | Daniels et al. |
| 2005/0256726 A1 | 11/2005 | Riley et al. |
| 2005/0256753 A1 | 11/2005 | Viet et al. |
| 2005/0262108 A1 | 11/2005 | Gupta |
| 2006/0047608 A1* | 3/2006 | Davis et al. .................. 705/400 |
| 2006/0143030 A1 | 6/2006 | Wertheimer |
| 2006/0248010 A1 | 11/2006 | Krishnamoorthy et al. |
| 2007/0055482 A1 | 3/2007 | Goodermote et al. |
| 2007/0174119 A1 | 7/2007 | Ramsey et al. |
| 2007/0288296 A1 | 12/2007 | Lewis |
| 2008/0077459 A1 | 3/2008 | Desai et al. |
| 2008/0208719 A1 | 8/2008 | Sharma et al. |

FOREIGN PATENT DOCUMENTS

| | | |
|---|---|---|
| WO | WO 01/11522 | 2/2001 |
| WO | 2007/002841 | 1/2007 |

OTHER PUBLICATIONS

Schinder et al.; "Increased Consumer Sales Response Through Use of 99-Ending Prices", 1996, Journal of retailing, vol. 72, pp. 187-199, pgs.*

International Search Report, issued Jun. 22, 2004, for International Application PCT/US03/13394.

De Prisco et al., "On Optimal Binary Search Trees", Information Processing Letters, vol. 45, pp. 249-253 (Apr. 1993).

Pedersen et al., "Multidimensional Database Technology", IEEE, Computer, vol. 34, Issue 12, pp. 40-46 (Dec. 2001).

Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).

Na, H.S. et al., "Data Scaling for Operational Risk Modelling", ERIM Report Series Research in Management, 24 pp. (Dec. 2005).

Peemoller, Fred A., "Operational Risk Data Pooling", Frankfurt/Main, Deutsche Bank AG, 38 pp. (Feb. 7, 2002).

Model1 by Group 1 Software, www.g1.com, Aug. 29, 1999, pp. 1-16, retrieved from Google.com and archive.org.

SAS Institute, Inc., www.sas.com, Jan. 29, 1998, pp. 1-28, retrieved from Google.com and archive.org.

Hollander, Geoffrey, "Modell deftly parses customer characteristics", InfoWorld, May 25, 1998, vol. 20, No. 21, pp. 1-4, , retrieved from Dialog, file 148.

"Unica Releases Model 1 Enterprise Edition", Business Wire, Oct. 29, 1998, pp. 1-3, retrieved from Proquest Direct.

Rosen, Michele, "There's Gold in That There Data", Insurance & Technology, Dec. 1998, vol. 23, No. 12, pp. 1-6, retrieved from Dialog, file 16.

Saarenvirta, Data Mining to Improve Profitability, CMA Magazine, vol. 72, No. 2, Mar. 1998, pp. 8-12.

Johnson et al, Recent Developments and Future Directions in Mathematical Programming, IBM Systems Journal, vol. 31, No. 1, 1992, p. 79-93.

Balintfy et al, Binary and Chain Comparisons with an Experimental Linear Programming Food Price Index, The Review of Economics and Statistics, vol. 52, No. 3, Aug. 1970, pp. 324-330.

Manchanda et al, The "Shopping Basket"; A Model for Multi-Category Purchase Incidence Decisions, Marketing Science, vol. 18, No. 2, 1999, pp. 95-114.

Data Mining News, Looking Past Automation, MarketSwitch Focuses on Optimization of Marketing Campaigns, Data Mining News, May 10, 1999.

Porter-Kuchay, Multidimensional Marketing, Target Marketing, Jan. 2000.

Spiegelman, Optimizers Assist in Specialized marketing Efforts, Computer Reseller News, Nov. 22, 1999.

Horngren, Charles T. et al., "Cost Accounting A Managerial Emphasis", Tenth Edition, Chapter 14, pp. 497-534, 2000.

"Advances in Mathematical Programming and Optimization in the SAS System" by Keamey, SAS Institute, SUGI Proceedings, 1999.

"SAS/OR Optimization Procedures, with Applications to the Oil Industry" by Cohen et al, SAS Institute, SUGI Proceedings, 1994.

"Supply chain design and analysis: models and methods" by Beamon, International Journal of Production Economics, 1998.

"An effective supplier development methodology for enhancing supply chain performance" by Lee et al, ICMIT, 2000.

"Perfect and Open Ratings Form Alliance to Provide Critical Supplier Performance Ratings to Private Exchanges and Net Markets", Business Wire, Oct. 30, 2000.

"i2 Technologies: i2 releases i2 five.two-the complete platform for dynamic value chain management; flexible, intuitive, powerful solutions designed to help companies gain efficiencies and drive revenue", M2 Presswire, Oct. 25, 2001.

"Simulation Optimization Using Soft Computing" by Andres Medaglia, PhD dissertation for Operations Research Department at North Carolina State University, Jan. 24, 2001.

"Supplier Selection and Management system Considering Relationships in Supply Chain Management" by Lee et al, IEEE Transactions on Engineering Management, Aug. 2001.

"Solver setting for optimal solutions" by Ananda Samudhram, New Straits Times, Nov. 22, 1999.

"Evaluating Suppliers of Complex Systems: A multiple criteria approach" by Cook et al, The Journal of the Operational Research Society, Nov. 1992.

Armstrong, Ronald D., et al., "The Multiple-Choice Nested Knapsack Model", Management Science, vol. 28, No. 1, pp. 34-43 (Jan. 1982).

Kelley, Dave, "Merchandise Intelligence: Predictive insights improve bottom line," RIS News, p. 32 (Mar. 2006).

Pisinger, David, "A Minimal Algorithm for the Multiple-Choise Knapsack Problem", Technical Report 94/25, DIKU, University of Copenhagen, Denmark, pp. 1-23 (May 1984).

Ramirez, Ariel Ortiz, "three-Tier Architecture," Linux Journal, downloaded from http://www.linuxjournal.com/article/3508, 4 pp. (Jul. 1, 2000).

Business Wire, "SAS and Kohl's Partner on Merchandise Intelligence Suite," downloaded from http://findarticles.com/p/articles/mi_m0EIN/is_2005_Jan_17/ai_n8695858/, 2 pp. (Jan. 17, 2005).

i2 Technologies, Inc., "Improving Service and Market Share with i2 Inventory Optimization: How superior inventory management can be deployed as a competitive weapon to drive the top and the bottom line", pp. 1-26 (Aug. 2004).

* cited by examiner

184348-Related Items

Product Details

Style: 184348  Total Items: 16  Description: RL INT LTX SG BR WH GAL

Related Items (2)

Show related by: All

| State | Style | Style Name ▲ | Description | Location Count | New Price ($) | Rule Violation Count |
|---|---|---|---|---|---|---|
| ☐ Related Item | 189249 | RL INT LTX SG... | RL INT LTX SG OTB GAL | 8 | 28.98-29.99 | 0-1 |
| ☐ Related Item | 189298 | RL INT LTX SG... | RL INT LTX SG NTB GAL | 8 | 28.98-29.99 | 0-1 |

Add To Plan    Close

COMPUTER-IMPLEMENTED SYSTEMS AND METHODS FOR PERFORMING PRICING ANALYSIS

CROSS-REFERENCE TO RELATED APPLICATIONS

This application contains subject matter that may be considered related to subject matter disclosed in U.S. Patent Application Ser. No. 60/923,454 (entitled "Computer-Implemented Promotion Optimization Methods And Systems" and filed on Apr. 13, 2007), and U.S. Patent Application Ser. No. 60/861,747 (entitled "Revenue Optimization Model Configuration" and filed on Nov. 29, 2006). The full disclosure, including the drawings, of each of these patent documents is incorporated herein by reference.

TECHNICAL FIELD

This document relates generally to computer-implemented retail sales modeling and more particularly to computer-implemented systems and methods for performing pricing analysis.

BACKGROUND

Retailers face a difficult task when attempting to establish prices for the products and/or services that they offer. The task involves balancing a seemingly set of opposing factors, such as trying to attain a profitable and rational mix of prices that will generate revenue and profit while maintaining a competitive price position. The task is made even more difficult if the retailers are confronted with many products that have to be priced.

SUMMARY

In accordance with the teachings provided herein, systems and methods for operation upon data processing devices are provided to assess regular prices for a plurality of items, where regular pricing has requirements (e.g., integer price requirements, price grid constraints, etc.). For example, a system and method can be configured to receive data about items to be priced. Sub-problem item groups are formed from the received data based upon pre-determined sub-problem grouping criteria, wherein each sub-problem item group includes the received data that relates to the items within that sub-problem item group. A non-linear optimization program is used to generate target item prices for a sub-problem item group by optimizing a pre-selected regular pricing objective function with respect to pre-selected business constraints. The non-linear optimization program ignores the integer pricing requirements and/or price grid constraints when optimizing the item pricing objective function associated with the sub-problem item groups. A mixed integer linear program is used to determine final target prices by minimizing distances associated with the item prices generated by the non-linear optimization program. The selected item prices are provided as output to a user or to another computer program.

As another example, a system and method for regular pricing optimization can be configured to decompose the pricing problem into sub-problems where items in a sub-problem are related by rules and/or cross effects. A non-linear optimization problem is solved to determine continuous optimal prices. A sequence of linear optimization problems provide an alternate approach to determine prices. A mixed integer linear programming problem is solved to snap prices to grid points and ensure that prices changes are at or above the minimum allowed changes.

BRIEF DESCRIPTION OF THE DRAWINGS

FIGS. 8-18 are graphical user interfaces that depict an example of interaction between a user and a regular price optimization system.

DETAILED DESCRIPTION

Figure 1:
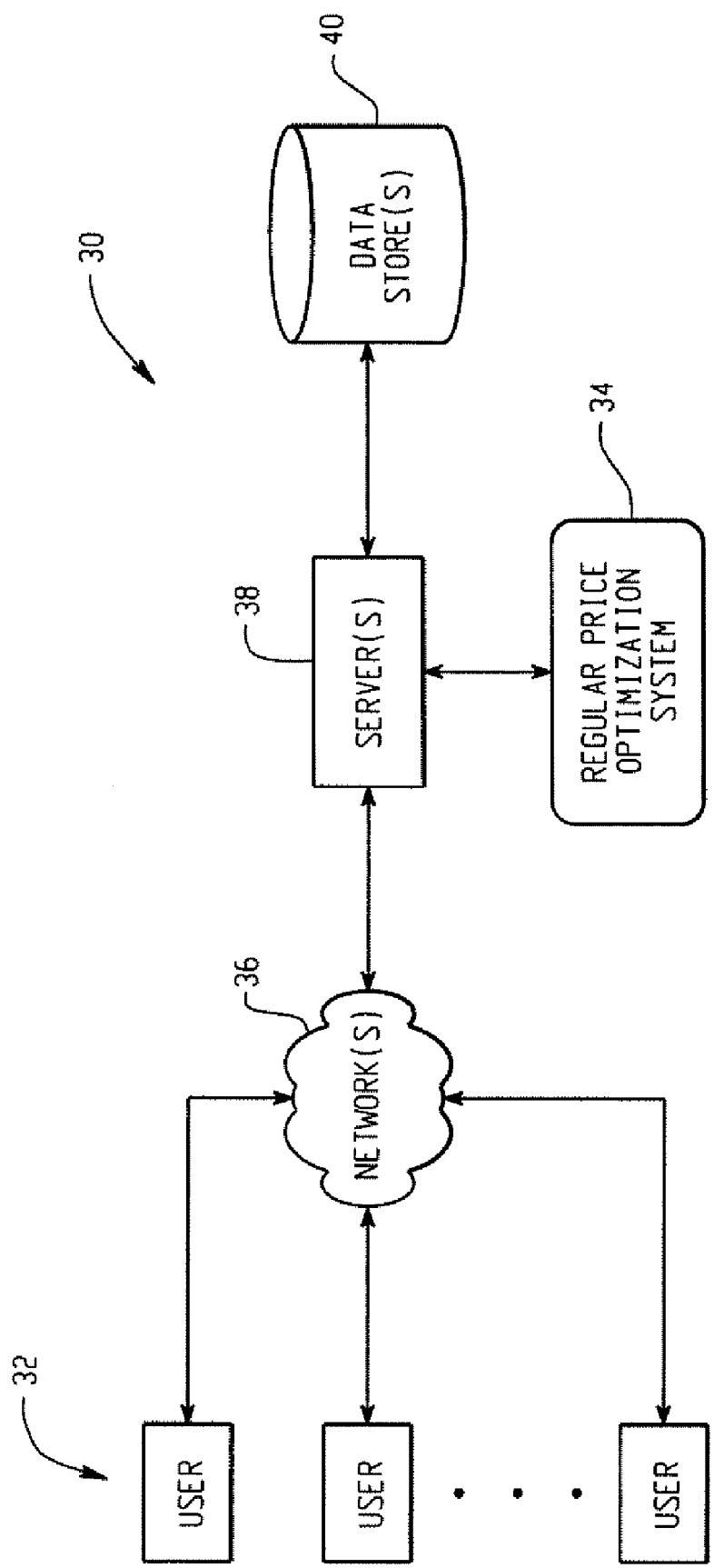
FIG. 1 is a block diagram depicting an environment wherein users can interact with a regular price optimization system to analyze item pricing.

FIG. 1 depicts at 30 an environment wherein users 32 can interact with a regular price optimization system 34 to generate regular (e.g., everyday or non-promotional) prices for selected items for sale. The regular price optimization system 34 seeks to maximize a business objective, such as revenue or margin. Alternatively, in combination with the maximization of a given business objective, users 32 may establish as a target a lower bound for a separate business objective. The system 34 attempts to meet the stated goal while satisfying the constraints created by users 32, which define the boundaries within which optimization of regular pricing may occur.

In addition to a lower bound for a secondary business objective, constraints may include, for example, that prices are to be constrained within an acceptable range around the price of a competitor, that prices are to be constrained within an acceptable range around the costs of items so that the margin on items is viable, or that prices must fall on a grid of prices and satisfy end-digit rules, such as the price of an item must end in 0.19, 0.39, 0.59, 0.79, or 0.99. Constraints generally are modeled as equalities or inequalities. Once the problem is defined, the pricing optimization proceeds by attempting to achieve a balance between the business objective and the constraints.

Users 32 can interact with the regular price optimization system 34 in a number of ways, such as over one or more networks 36. Server(s) 38 accessible through the one or more networks 36 can host the regular price optimization system 34. One or more data stores 40 can store the data to be analyzed by the system 34 as well as any intermediate or final data generated by the system 34.

The regular price optimization system 34 can be an integrated web-based tool that provides users functionality for optimizing regular pricing. It should be understood that the regular price optimization system 34 could also be provided on a stand-alone computer for access by a user.

Figure 2:
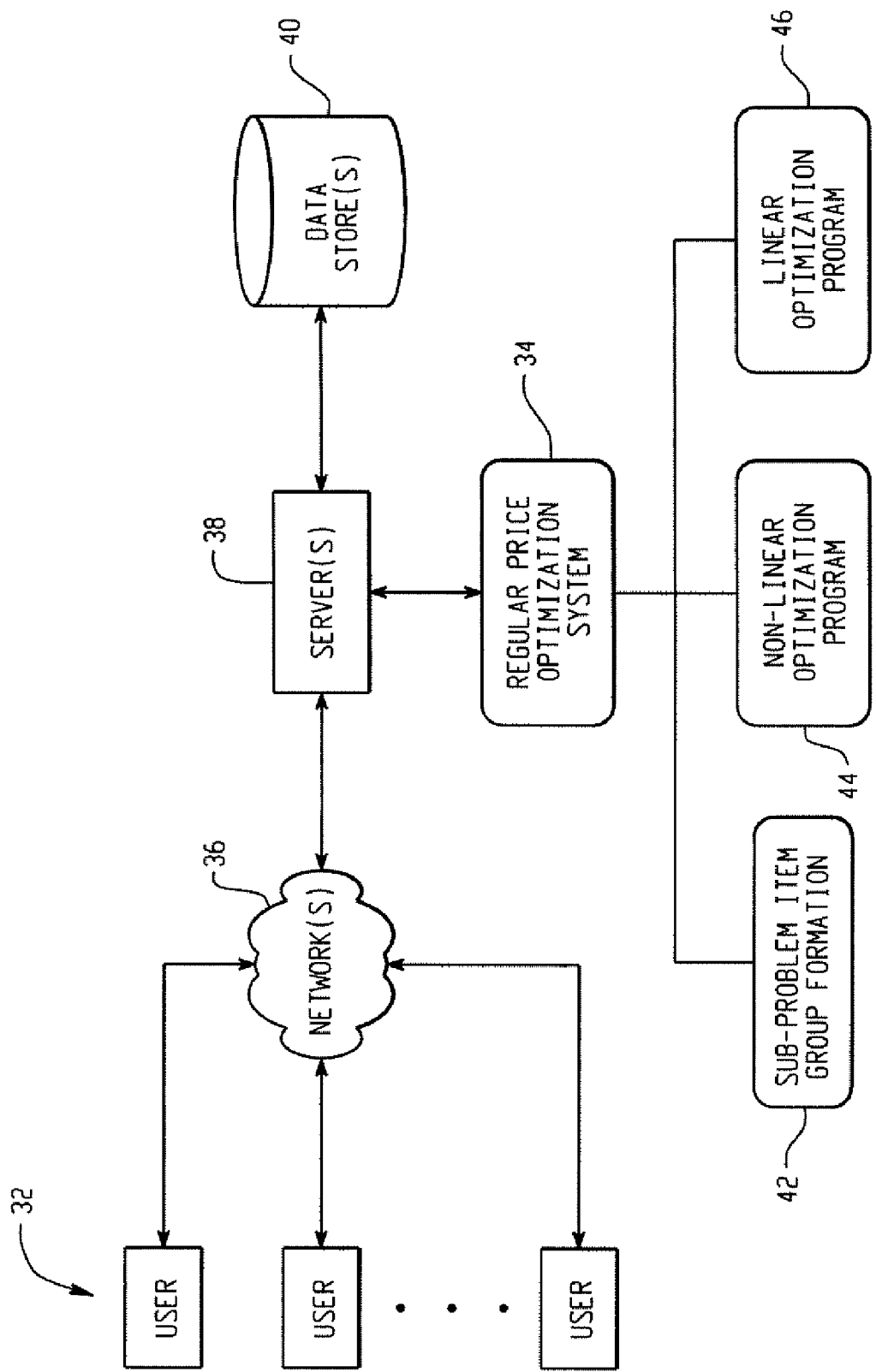
FIG. 2 is a block diagram depicting example software routines of a regular price optimization system.

FIG. 2 depicts software components that can comprise parts of a regular price optimization system 34. These include a sub-problem item group formation component 42, a non-linear optimization component 44, and a linear optimization component 46.

A sub-problem item group formation component 42 is used to decompose the regular price optimization problem into sub-problems. This may be done, for example, to reduce the complexity that could result from attempting to perform a pricing optimization for multiple thousands of items at once (e.g., tens/hundreds of thousands of items). Each sub-problem then may be solved through use of either a non-linear optimization program 44 or a linear optimization program 46. These programs perform an optimization on each of the sub-problems generated by the sub-problem item group formation component 42, and the results are later combined to produce a full solution to the overall regular price optimization problem.

Figure 3:
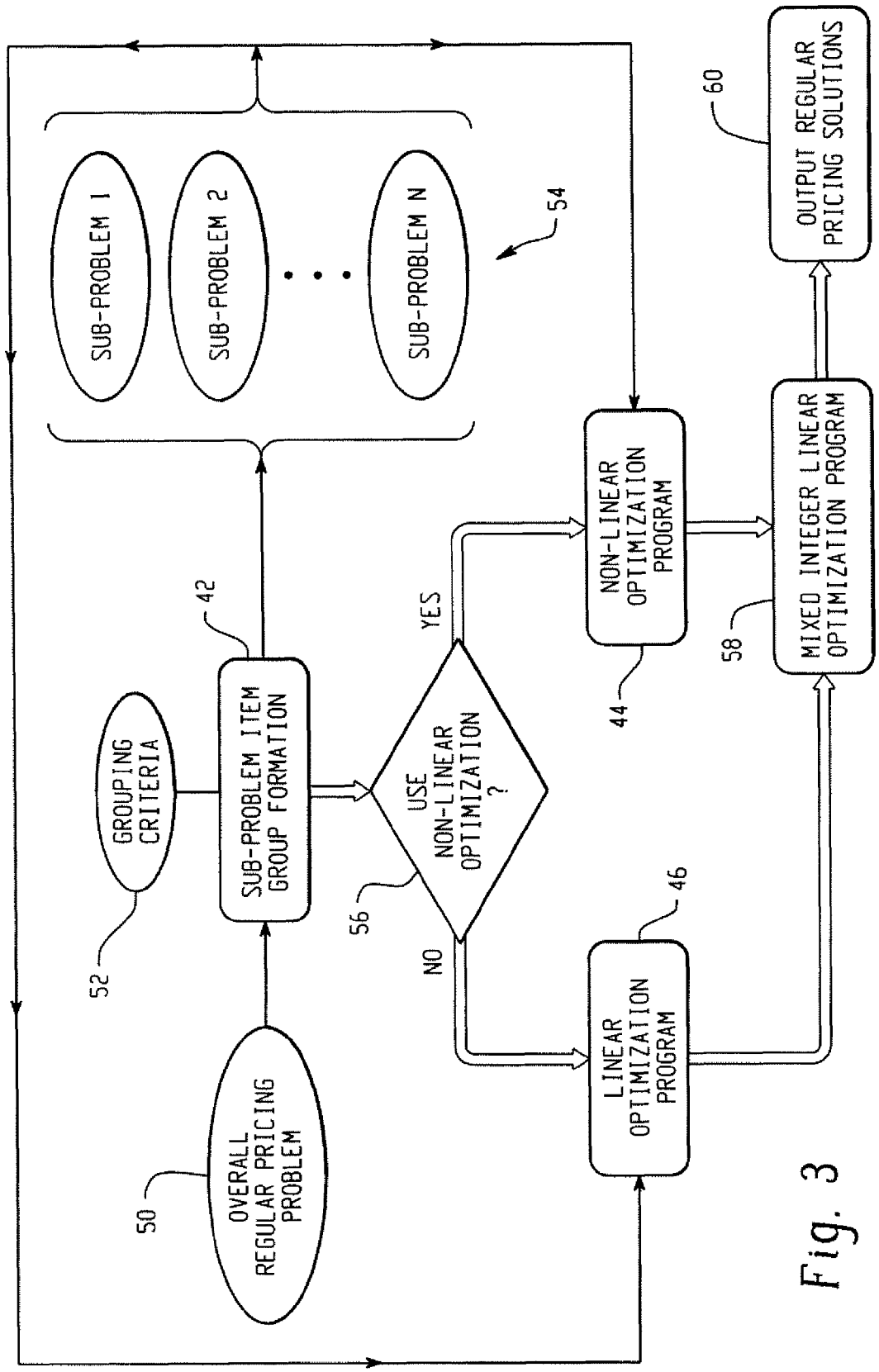
FIGS. 3-5 are process flow diagrams depicting various operational scenarios of regular price optimization systems.

FIG. 3 depicts an operational scenario involving a regular price optimization system. Initially, the sub-problem item group formation component 42 addresses the overall regular pricing problem 50 through the use of grouping criteria 52. The grouping criteria may be used to group, for example, items that share common characteristics, such as all paints of a given brand or all cabinets of a particular size. As an alternative, the grouping criteria may be used to group items that tend to influence sales of other items in the group, such as snow shovels and snow blowers. The application of the grouping criteria to the overall regular pricing problem results in the creation of sub-problems 54. Thus, within each sub-problem, items that are related to each other by either cross-effects of prices on demands or relationship rules based on brands, sizes, etc. are considered within a single context and are referred to as a sub-problem item group.

Once the sub-problem item group formation is complete, the system decides at process 56 whether to use a non-linear optimization program 44 or a linear optimization program 46. The system will use the non-linear optimization program 44 or linear optimization program 46 on each of the sub-problems 54 that have been formed. The output of the non-linear optimization program 44 or linear optimization program 46 then becomes the input to the mixed integer linear optimization program 58. The mixed integer linear optimization program 58 optimizes the solutions produced by the non-linear optimization program 44 or linear optimization program 46 for the sub-problems 54.

In this example, the solution produced by the non-linear optimization program 44 or linear optimization program 46 is optimal only in the absence of price grid and minimum price change requirements. Thus, further optimization is performed through the use of a mixed integer linear optimization program 58. The mixed integer linear optimization program 58 solves its input problem by minimizing the distance of the final set of prices from the prices returned by the non-linear optimization program 44 or linear optimization program 46 while satisfying the business constraints modeled by linear equalities and inequalities. Thus, the distances of the output regular pricing solutions 60 from the optimal solutions output by the non-linear optimization program 44 or linear optimization program 46 serve as a surrogate for the business goal captured by the non-linear formulation. By combining the decomposition of a larger problem into sub-problems, non-linear or linear optimization of each of the sub-problems, and the mixed integer linear optimization of the solutions for the sub-problems, the regular price optimization system provides a computationally feasible approach to determining prices for a large-scale regular price optimization problem.

Figure 4:
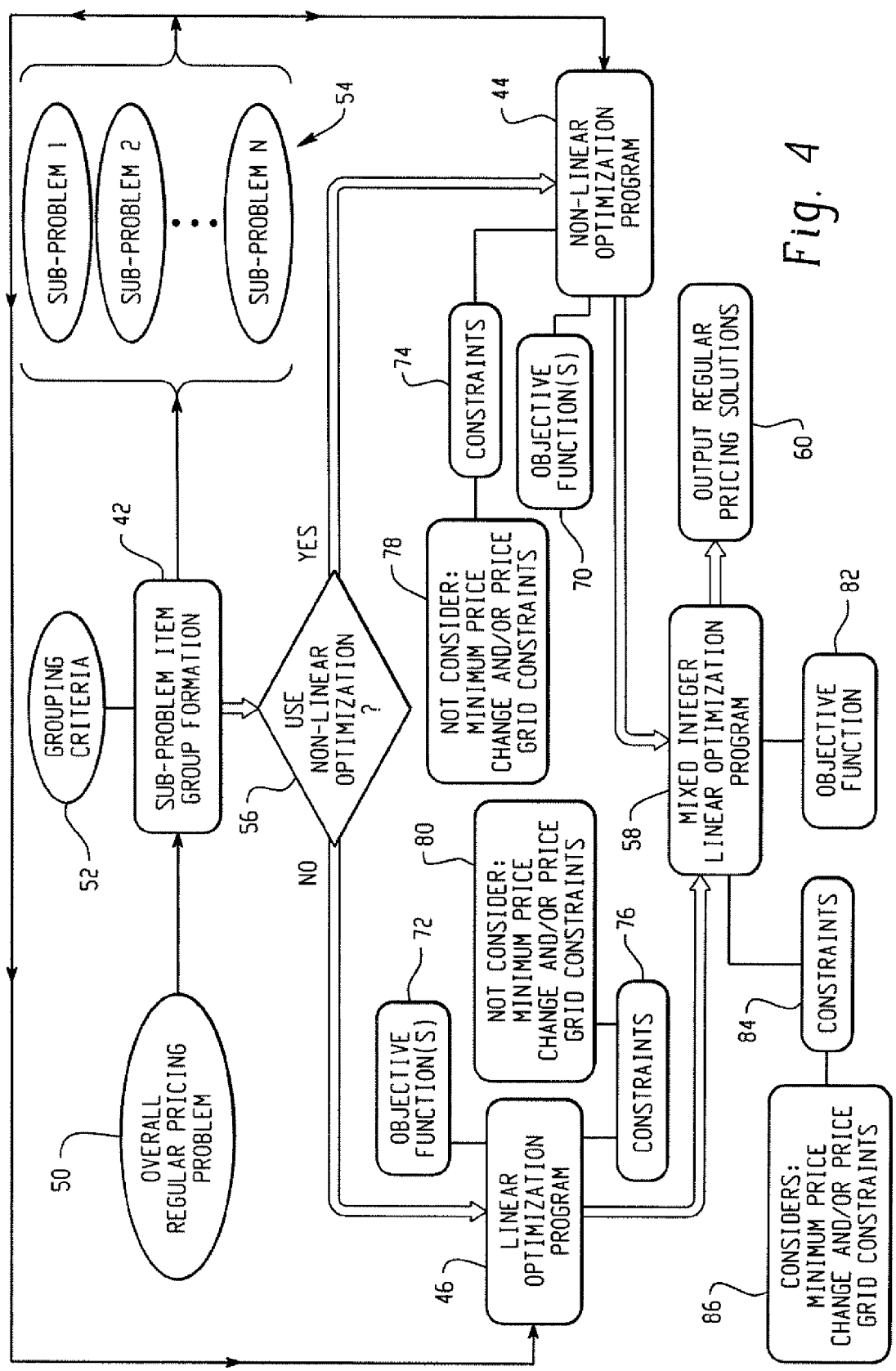

It should be understood that similar to the other processing flows described herein, the steps and the order of the steps in the processing flow of FIG. 3 may be altered, modified, removed and/or augmented and still achieve the desired outcome. As an illustration, FIG. 4 shows that the optimization performed by the system may involve other aspects as well. The non-linear optimization program 44, for example, may use objective function 70, which is used within the optimization program to maximize a particular business objective, such as revenue or margin. Similarly, the linear optimization program may use objective function 72 as part of its optimization. A business constraint, for example a margin target, that spans multiple sub-problems can be distributed over the group of sub-problems 54 using the proportions of estimated margin values achieved by the sub-problems given current price settings.

The optimization performed by the non-linear optimization program 44 also uses constraints 74. The constraints 74 may take many forms, and it is the constraints that define the boundaries within which the regular price optimization will take place. For example, a user may create a constraint that the regular price for an item must be within a certain percentage above or below the price for which that item is sold by a competitor. In another example, the user may create a constraint wherein the regular price for an item is within a certain percentage above or below the costs associated with that item. Still another example of a constraint that may be imposed is the use of what is called a price grid. A price grid allows a user to define a group of prices, one of which must be chosen by the regular price optimization system for an item. One example of a price grid is a grid that defines end-digit rules. In a retail establishment, for example, a retailer may wish that all prices end in a value of 9, or the retailer may wish to further constrain the group of prices such that all prices end in one of 0.19, 0.39, 0.59, 0.79, or 0.99. The linear optimization program 46 also may make use of constraints 76 in the ways discussed above with respect to the non-linear optimization program 44.

As another aspect of the optimization, the non-linear optimization program 44, in applying constraints 74 as a part of the optimization process, ignores the integer requirements of the problem, such as the minimum price change and/or price grid constraints 78. Thus, the prices generated by the non-linear optimization program 44 may not fall on the price grid or may change too little from the current prices at this step in the solution approach. Similarly, the sequential use of linear optimization program 46 also may ignore the minimum price change and/or price grid constraints 80 as part of applying constraints 76 in the optimization process.

The mixed integer linear optimization program 58, as part of generating the regular pricing solutions 60 for output, also may use an objective function 82 within its optimization. Similarly, the mixed linear optimization program 58 may apply constraints 84 to its optimization process. One example of a constraint that may be applied is that the mixed integer linear optimization program 58 can consider the minimum price change and/or price grid constraints 86 that the non-linear optimization program 44 and the sequential runs of linear optimization program 46 may have ignored during those optimization processes.

Figure 5:
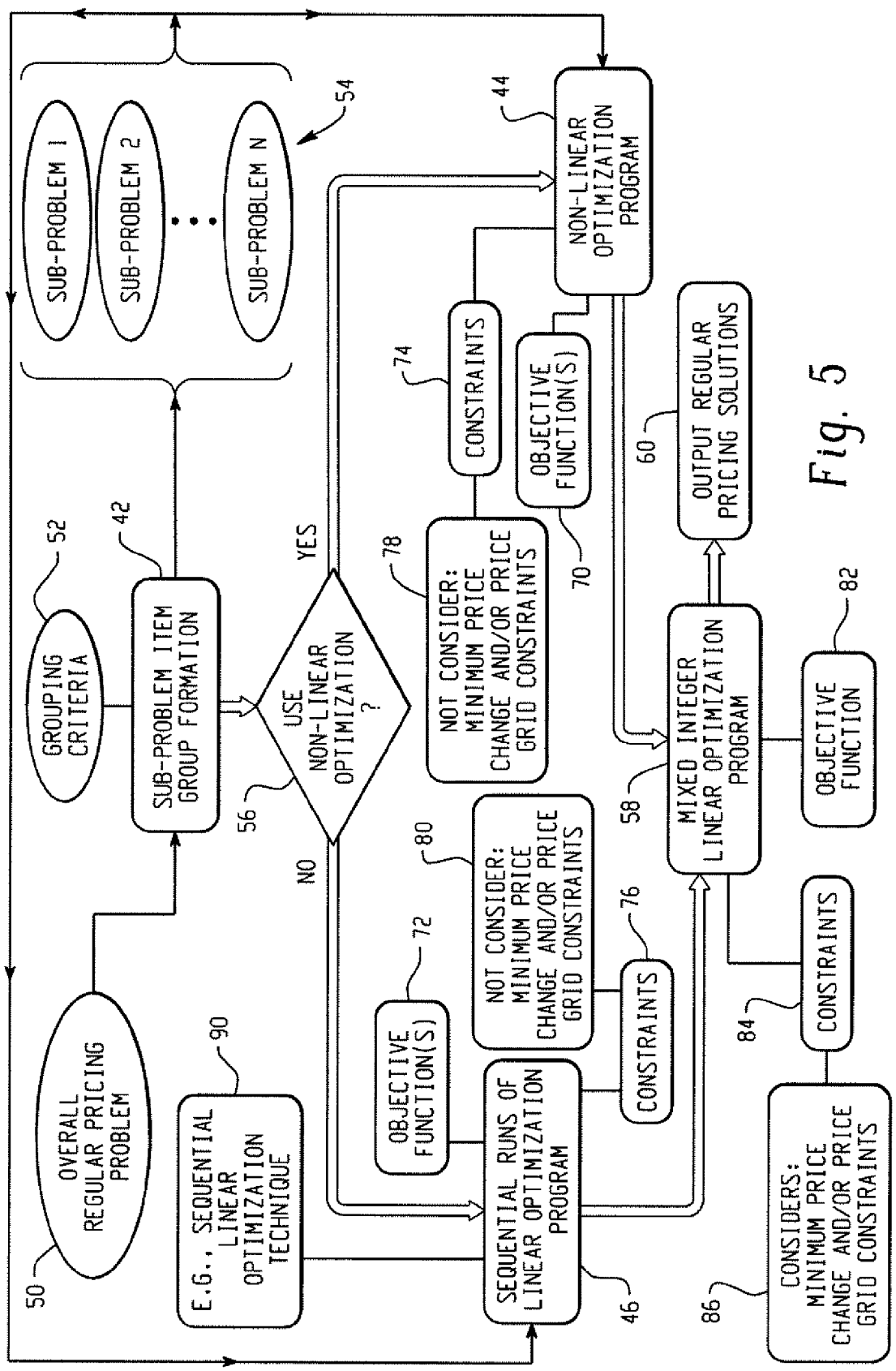

FIG. 5 depicts another operational scenario involving a regular price optimization system. While a regular price optimization system generally will try to use a nonlinear optimization program 44 to produce solutions to the sub-problems, occasionally the nonlinear optimization will prove too complex or time-consuming. In cases where the nonlinear optimization is too complex or time-consuming, the system may instead use a linear optimization technique 46 (e.g., a sequential linear optimization technique 90) to produce a solution to a given sub-problem or sub-problems within the overall regular price optimization problem. The optimization of regular pricing problem is especially susceptible to overly complex non-linear problems, given the size of the retail optimization problem, which may involve determination of tens of thousands of prices at thousands of locations or stores for a typical retailer with a nationwide presence.

Figure 6:
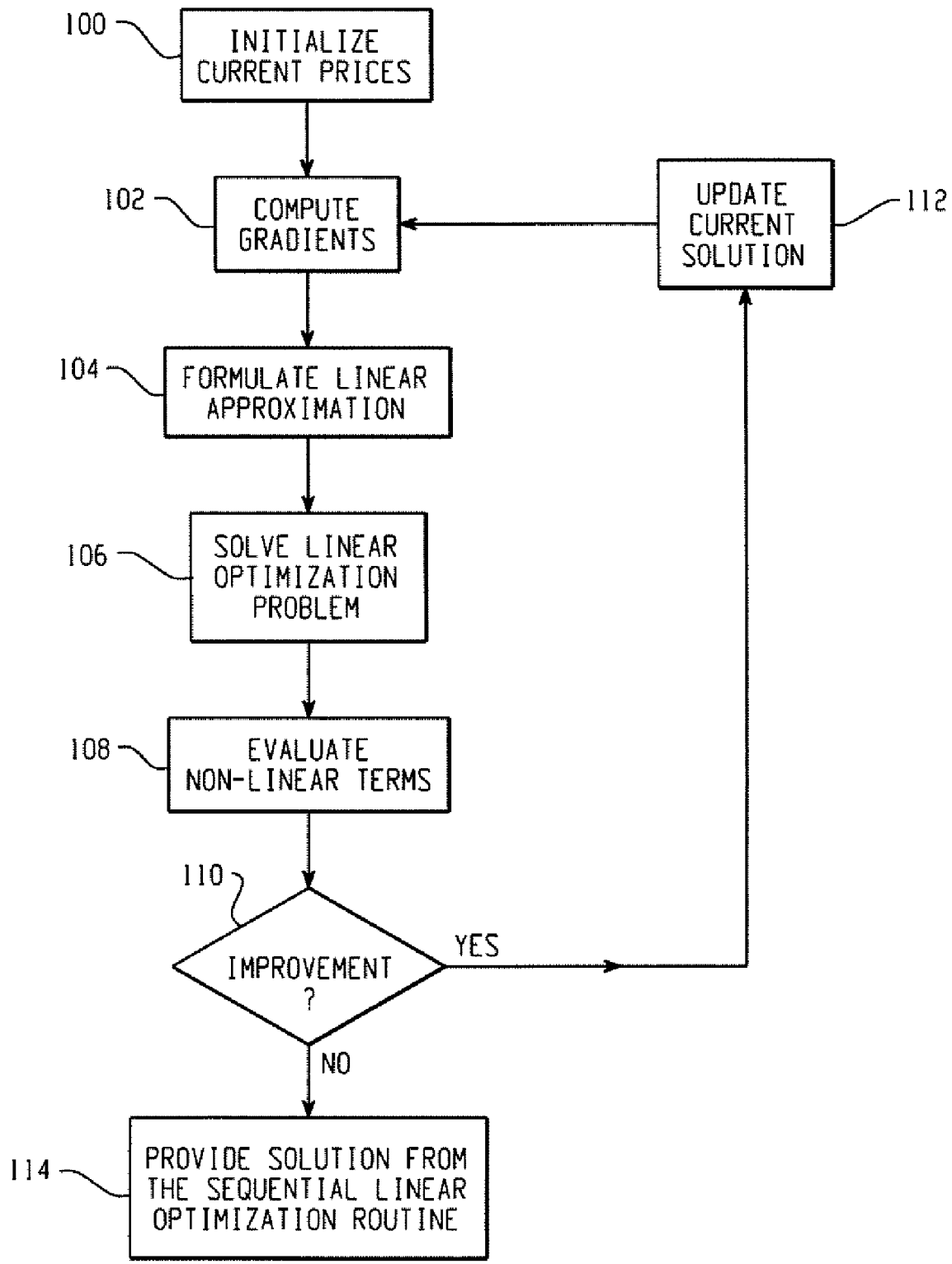
FIG. 6 is a flowchart depicting operations of a regular price optimization system.

FIG. 6 is a flow chart depicting an operational scenario that solves a non-linear optimization problem using the solutions of a sequence of linear optimization problems. At step 100 the system initializes the prices to the current regular prices. Thus, the initial solution equates to making no changes to the existing prices. At step 102 the system computes the gradients of the nonlinear terms in the optimization formulation with respect to prices. These gradients are used to generate a linear approximation of the nonlinear term. As an example, a non-linear term, such as the function of price "f(p)", can be replaced by:

$$f(p_0) + \Delta p \frac{\partial f(p)}{\partial p}$$

where $p_0$ represents the values of the current prices in the algorithm, $\Delta p$ represents the incremental changes in current prices, $f(p_0)$ represents the value of the nonlinear term at current prices, and $$\frac{\partial f(p)}{\partial p}$$

represents the partial derivative of the nonlinear term f(p) at $p_0$.

Once gradients have been computed, the system at step 104 formulates a linear approximation of the non-linear optimization problem by: first, replacing the non-linear terms by the first-order approximation; and second, limiting the change in current prices represented by $\Delta p$ to small values so that the linear approximation remains close to the nonlinear formulation.

Once the linear optimization problem has been formulated, the system solves the linear optimization problem 106. The system then, at step 108, evaluates the non-linear terms to compute the exact value of the objective for the nonlinear optimization problem. The solution obtained by solving the linear optimization problem then is compared at decision step 110 to the current solution to determine which is better. If the solution obtained by solving the linear optimization problem is better than the current solution, then the current solution is replaced at step 112 by the solution obtained by solving the linear optimization problem, which then becomes the current solution. From there, the process returns to computing the gradients of the nonlinear terms at step 102, and the process continues in an iterative fashion. If the comparison decision at 110 determines that the current solution cannot be improved by making incremental changes in prices, then the process is stopped and the current solution is provided as the solution of the sequential linear optimization routine at step 114.

Figure 7:
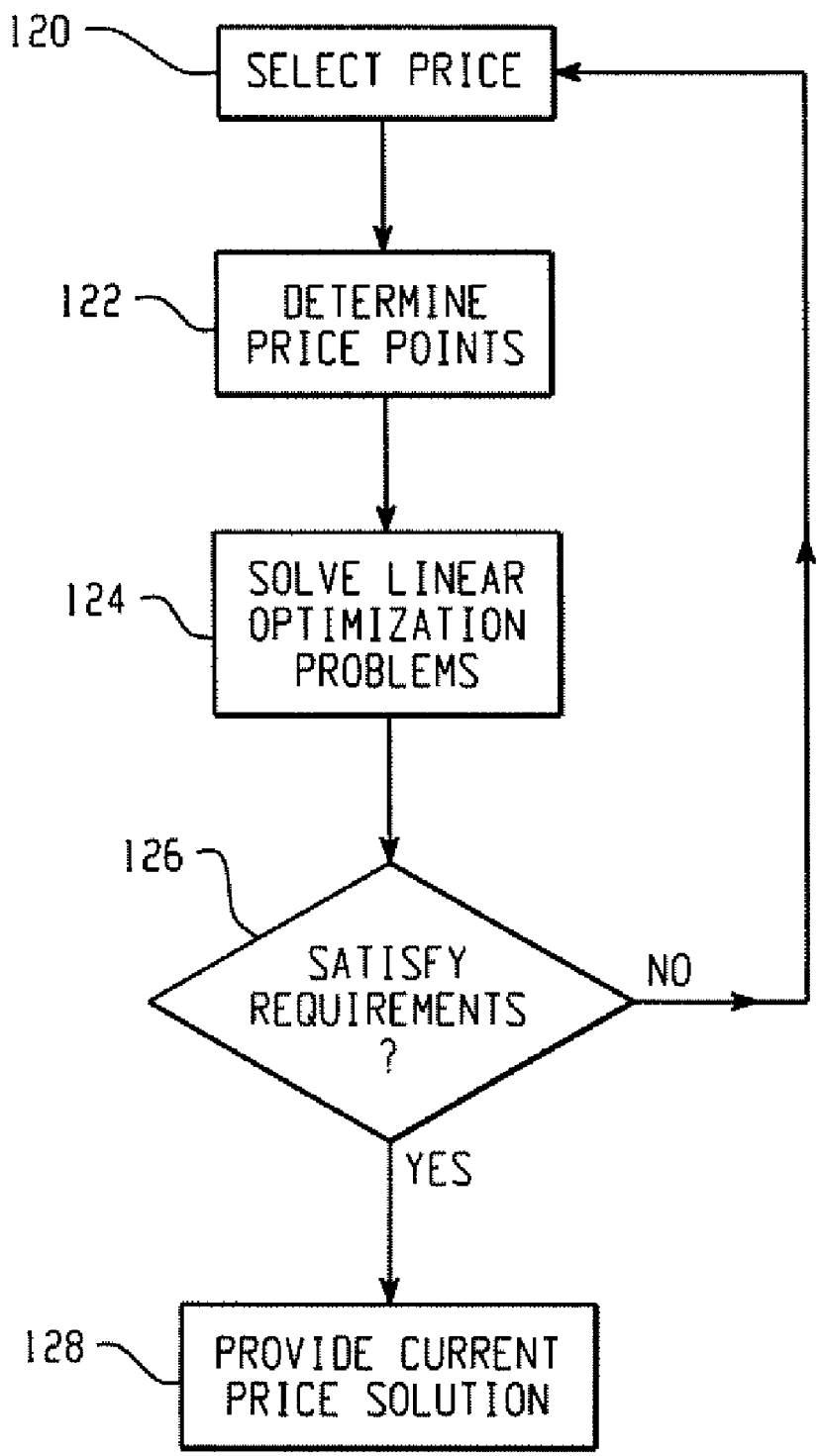
FIG. 7 is a flowchart of an example for performing a mixed integer linear optimization procedure.

FIG. 7 depicts an operational scenario involving a mixed integer linear optimization program used in a regular price optimization system. At step 120, the system selects a price from the current solution that does not satisfy the integer pricing requirements, e.g., the price grid, price ending rules, and minimum price change requirement. The current solution is that which was provided by, for example, the non-linear optimization program described with respect to FIG. 6. Once a price is selected, the system determines at step 122 the two price points from the price grid that are around the price selected at step 120. The grid points should surround the selected price and satisfy the minimum price change requirement. The next step in the process flow is to solve at step 124 two linear optimization problems. The linear optimization problems are constructed by fixing for each the selected price at one of the two price points selected at step 122. The linear optimization minimizes the distance of the prices from the current solution while satisfying the price constraints to the fullest extent possible. Once the problems are solved, the system selects the better solution and fixes the selected price at the grid point that corresponds to that solution. The process continues then to determine at step 126 whether all of the prices in the current solution satisfy the integer requirements. If not, then the process returns to the step of selecting a price at 120. If the current solution does not have any prices that fail to satisfy the integer requirements, then the current solution is provided as the output of the mixed integer linear optimization program 128.

In modeling the demand for an item at a location, the system may use a direct model or a share model. Each of those models may take two forms, the log-log form or the log-linear form. The equations representing the various forms for the models are represented below. In the equations, the lowercase letter i and j represent the index of an item. The lowercase letter l represents the index of a location. The term $p_{il}$ is the recommended price of item i at location l. The term $c_{il}$ is the cost of item i at location l. The term $rp_{il}$ is the reference price of item i at location l. The reference price denotes the price at which the base forecast of an item's demand is produced. A recommended price, $p_{il}$, that is different from the reference price results in the demand for an item being modified as determined by the demand model. The term $f_{il}$ is the base forecast for item i at location l, indicating the demand for item i at location l at its reference price, $rp_{il}$. The term $d_{il}$ is the demand for item i at location l considering the price of i at l as well as other items whose prices have a cross effect on the demand for i. The capital I represents the set of items whose prices affect the demand for item i. Item i is included as a member of set I.

In the direct model of demand, the demand for an item i at location l is determined by its own price and prices of other items that have cross effect on the demand of i. The log-log form of the direct model of demand is expressed by the equation:

$$d_{il} = f_{il} \times \prod_{j \in I} \left( \frac{p_{jl}}{rp_{jl}} \right)^{a_{ijl}}$$

wherein $\alpha_{ijl}$ equals the cross elasticity coefficient denoting the effect of the price of item j on the demand of item i at location l. The log-linear form of the direct model of demand is expressed by the equation:

$$d_{il} = f_{il} \times \prod_{j \in I} e^{a_{ijl} \times \left( \frac{p_{jl}}{rp_{jl}} - 1 \right)}$$

wherein the terms have the same meanings as in the log-log form.

In the share model of demand, the share of demand for item i at location l in a model group consisting of several (item, location) pairs is determined by its own price and prices of other items that have cross effect on the demand of i. The log-log form of the share model of demand is expressed by a set of equations, the first two of which are:

$$\text{attraction}_{il} = f_{il} \times \prod_{j \in l} \left(\frac{p_{jl}}{rp_{jl}}\right)^{\alpha_{ijl}}$$

$$\text{share}_{il} = \frac{\text{attraction}_{il}}{\sum_{jl \in MG} \text{attraction}_{jl}}$$

wherein attraction$_{il}$ is the attractiveness of item i at location l for calculating the share of its demand in the demand for the model group, share$_{il}$ is the share, or ratio, of the model group's demand that is captured by item i at location l, and MG is the set of (item, location) pairs in the model group. The demand for item i at location l then would be calculated as:

$$d_{il} = \text{share}_{il} \times d_{MG}$$

wherein $d_{il}$ is the demand for item i at location l and $d_{MG}$ is the overall demand for the (item, location) pairs in the model group. Further, the overall demand for (item, location) pairs in a model group is calculated as:

$$d_{MG} = f_{MG} \times p_{MG}^{\alpha_{MG}}$$

$$p_{MG} = \sum_{il \in MG} \text{share}_{il} \times \frac{p_{il}}{rp_{il}}$$

wherein $f_{MG}$ is the base forecast for the model group and $\alpha_{MG}$ is the price elasticity of the model group. Thus, $p_{MG}$ denotes the weighted average of the ratio of price to reference price over the (item, location) pairs in the model group. Shares for (item, location) pairs are used as weights.

The log-linear form of the share model of demand is similarly built from a set of equations, as listed below. The first two equations are:

$$\text{attraction}_{il} = f_{il} \times \prod_{j \in l} e^{\alpha_{ijl} \times \left(\frac{p_{jl}}{rp_{jl}} - 1\right)}$$

$$\text{share}_{il} = \frac{\text{attraction}_{il}}{\sum_{jl \in MG} \text{attraction}_{jl}}$$

wherein terms are interpreted in the same way as in the log-log form of the share model. The demand for item i at location l then is calculated as $$d_{il} = \text{share}_{il} \times d_{MG}$$

while the overall demand for (item, location) pairs in a model group is calculated as $$d_{MG} = f_{MG} \times e^{\alpha_{MG} \times (p_{MG} - 1)}$$

$$p_{MG} = \sum_{il \in MG} \text{share}_{il} \times \frac{p_{il}}{rp_{il}}$$

where, again, the interpretation of the terms is the same as in the log-log form of the share model.

As mentioned above, the overall regular pricing optimization problem is a large-scale nonlinear mixed integer optimization problem. The solution approach decomposes the overall problem into a number of sub-problems. Two items i and j belong to a sub-problem if either the two items are related by an item relationship rule or the price of one item affects the demand of another item. The sub-problems can be solved independently to provide the solution of the overall problem. Since each sub-problem is a nonlinear mixed integer optimization problem, it is solved as a sequence of linear optimization problems followed by a mixed integer linear optimization problem.

For the nonlinear optimization portion of the overall optimization problem, in formulating the nonlinear optimization problem, the driver variable is the price variable, which is represented by the term $p_{il}$. The term is equivalent to the price of item i at location l. If the price is required to be uniform over a group of items and locations, then only one price variable is defined over this group of prices.

Margin constraints within the nonlinear optimization problem may be represented by the following inequality:

$$\frac{c_{il}}{1 - \text{margPctLB}_{il}} \leq p_{il} + \text{margSl}_{il} - \text{margSu}_{il} \leq \frac{c_{il}}{1 - \text{margPctUB}_{il}}$$

wherein $c_{il}$ is the cost of item i at location l. The fraction on the left computes price that will result in the lowest allowed percent margin for the item. Similarly, the fraction on the right computes the price that will result in the largest allowed margin for the item. The term margPctLB$_{il}$ is the lower bound on the percent margin for item i at location l, while margPctUB$_{il}$ is the upper bound on the percent margin for item i at location l. The term margSl$_{il}$ denotes the variable representing the slack in satisfying the constraint if price $p_{il}$ falls below the lower bound on the price, while margSu$_{il}$ denotes the variable representing the surplus in satisfying the constraint if price $p_{il}$ exceeds the upper bound on the price.

Competitive constraints within the nonlinear optimization problem may be represented by the following inequality:

$$\text{comp}_{kil} \times \text{compPctLB}_{kil} \leq p_{il} + \text{compSl}_{kil} - \text{compSu}_{kil} \leq \text{comp}_{kil} \times \text{compPctUB}_{kil}$$

wherein comp$_{kil}$ is the price offered by competitor k for item i at location l. The multiplication on the left of the inequality computes the price that will result in the lowest allowed price given the competitor's price for the item. Similarly, the multiplication on the right of the inequality computes the price that will result in the largest allowed price given the competitor's price for the item. The terms compPctLB$_{kil}$ and compPctUB$_{kil}$ represent the lower and upper bounds, respectively, on the percentage relative to the price offered by competitor k for item i at location l. The term compSl$_{kil}$ denotes the variable representing the slack in satisfying the constraint if the price $p_{il}$ falls below the lower bound on the price, while the term compSu$_{kil}$ denotes the variable representing the surplus in satisfying the constraint if price $p_{il}$ exceeds the upper bound on the price.

Item relationship constraints within the nonlinear optimization problem may be represented by the following inequality:

$$p_{il} - \text{itemRelSu}_{ijl} \leq \text{mult}_{ij} \times p_{jl} + \text{const}_{ij}$$

wherein itemRelSu$_{ijl}$ denotes the variable representing the surplus in satisfying the inequality relating $p_{il}$ to $p_{jl}$. The term mult$_{ij}$ is a multiplier on $p_{jl}$ in the relationship between $p_{il}$ and $p_{jl}$. Because item relationships are between item pairs and do not vary by location, the multiplier does not have subscript l. The term $const_{ij}$ is a constant in the relationship. The value of the constant can be either positive or negative. The constant also does not vary by location. It is possible to specify item relationship constraints with a mix of $\leq$ and $\geq$ constraints. The second type of constraints are specified as:

$$p_{il} + \text{itemRelSl}_{ijl} \geq \text{mult}_{ij} \times p_{jl} + \text{const}_{ij}$$

wherein $\text{itemRelSl}_{ijl}$ denotes the variable representing the slack in satisfying the inequality relating $p_{il}$ to $p_{jl}$.

When formulating the nonlinear optimization problem, constraints on the maximum change from the current price may be represented by the following inequality:

$$cp_{il} \times (1 - \text{maxPctDev}_i) \leq p_{il} + \text{curPrSl}_{il} - \text{curPrSu}_{il} \leq cp_{il} \times (1 + \text{maxPctDev}_i)$$

wherein $cp_{il}$ is the current price of item i at location l. The term $\text{maxPctDev}_i$ is the maximum allowed percent deviation from the current price, which is a parameter that does not vary by location. The term $\text{curPrSl}_{il}$ denotes the variable representing the slack if the price falls below the lower limit, while the term $\text{curPrSu}_{il}$ denotes the variable representing the surplus if the price exceeds the upper limit.

Demand targets within the nonlinear optimization problem may be represented by the following inequality:

$$\sum_{il \in DTSCOPE} d_{il} + dtSlack \geq DTarget_{DTSCOPE}$$

wherein DTSCOPE is the set of (item, location) pairs in scope over which the demand target is specified. The term $d_{il}$ represents the demand for item i at location l obtained using the demand models specified in the direct model of demand, which relate demand to prices. The term dtSlack denotes the variable representing slack in reaching the target value for demand. The term $DTarget_{DTSCOPE}$ is the target value that serves as a lower bound on demand.

Revenue targets within the nonlinear optimization problem may be represented by the following inequality:

$$\sum_{il \in RTSCOPE} d_{il} \times p_{il} + rtSlack \geq RTarget_{RTSCOPE}$$

wherein RTSCOPE is the set of (item, location) pairs in scope over which the revenue target is specified. The term rtSlack denotes the variable representing slack in reaching the target value for revenue. The term $RTarget_{RTSCOPE}$ is the target value that serves as a lower bound on revenue.

Margin targets within the nonlinear optimization problem may be represented by the following inequality:

$$\sum_{il \in MTSCOPE} d_{il} \times (p_{il} - c_{il}) + mtSlack \geq MTarget_{MTSCOPE}$$

wherein MTSCOPE is the set of (item, location) pairs in scope over which the margin target is specified. The term mtSlack denotes the variable representing slack in reaching the target value for margin. The term $MTarget_{MTSCOPE}$ is the target value that serves as a lower bound on margin.

Percent margin targets within the nonlinear optimization problem may be represented by the following inequality:

$$\frac{\sum_{il \in PTSCOPE} d_{il} \times (p_{il} - c_{il})}{\sum_{il \in PTSCOPE} d_{il} \times p_{il}} + ptSlack \geq PTarget_{PTSCOPE}$$

wherein PTSCOPE is the set of (item, location) pairs in scope over which the percent margin target is specified. The term ptSlack denotes the variable representing the slack in reaching the target value for percent margin. The term $PTarget_{PTSCOPE}$ is the target value that serves as a lower bound on percent margin.

The overall objective the system seeks when solving the regular price optimization problem is specified in terms of the target components. Combining the target components leads to the overall objective, which is represented as follows:

$$\omega_{demObj} \sum_{il} d_{il} + \omega_{revObj} \sum_{il} d_{il} p_{il} + \omega_{margObj} \sum_{il} d_{il}(p_{il} - c_{il}) + \omega_{pctMargObj} \frac{\sum_{il} d_{il}(p_{il} - c_{il})}{\sum_{il} d_{il} p_{il}}$$

wherein only one of the four weights ($\omega$ multipliers) is set to a nonzero value. The other three KPIs are given a weight of zero, which results in only one KPI being maximized.

Penalties related to each of the constraints also are defined, which the system will seek to minimize during the optimization process. Penalties from margin constraints may be defined as:

$$\sum_{il} \omega_{marg_{il}} margSl_{il} + \sum_{il} \omega_{marg_{il}} margSu_{il}$$

representing the weighted sum of margin penalties, which is to be minimized. Similarly, the penalties from competition constraints may be defined as:

$$\sum_{kil} \omega_{comp_{kil}} compSl_{kil} + \sum_{kil} \omega_{comp_{kil}} compSu_{kil}$$

representing the weighted sum of competition penalties, which is to be minimized. The penalties from item relationship constraints may be defined as:

$$\sum_{ijl} \omega_{itemRel_{il}} itemRelSl_{ijl} + \sum_{ijl} \omega_{itemRel_{il}} itemRelSu_{ijl}$$

representing the weighted sum of item relationship penalties, which is to be minimized. As shown here, the weights vary by only one item in the pair of items that forms the relationship constraint. Finally, the penalties from maximum change in current price constraints may be defined as:

$$\sum_{il} \omega_{curPrice_{il}} curPriceSl_{il} + \sum_{il} \omega_{curPrice_{il}} curPriceSu_{il}$$

representing the weighted sum of current price deviation penalties, which is to be minimized. In addition, the weighted sum of slacks in achieving targets is to be minimized, a quantity that may be defined as:

$$\omega_{dtSlack}*dtSlack+\omega_{rtSlack}*rtSlack+\omega_{mtSlack}*mtSlack+ \omega_{ptSlack}*ptSlack$$

For the mixed integer linear optimization (MILP) portion of the overall optimization problem, the formulation takes as input the solution of the nonlinear optimization problem. The optimal prices output by the nonlinear optimization problem are denoted as $p_{il}^*$ which is equivalent to the optimal price for item i at location l from the nonlinear optimization problem formulation. The variable $p_{il}$, then, is redefined as representing the solution from the MILP formulation, specifically the optimal price for item i at location l from the mixed integer linear optimization formulation. The MILP formulation also includes all of the constraints defined with respect to the nonlinear optimization problem, except the target constraints, and the MILP formulation also introduces additional constraints.

The MILP formulation makes use of grid point and minimum price change constraints. Price grid points are either explicitly defined in the data or are obtained using the ending rules. Since final prices should be aligned with the grid points, the MILP formulation is set to minimize the deviation from the optimal prices returned by the nonlinear optimization problem while satisfying the pricing rules and moving prices to the grid. Another constraint imposed by the MILP is the requirement of a minimum change for all prices that are different from the current prices. For example, the constraint might require that the price change should be at least as large as five cents or one percent. The minimum price change requirement is achieved by excluding grid points that are too close to the current price as candidate grid points in the MILP formulation. This constraint can be represented by the following equation:

$$p_{il} = \sum_{gp \in GP_{il}} P_{gp} X_{gp}$$

wherein $p_{il}$ is the price of item i at location l in the MILP formulation. The term $GP_{il}$ is the set of candidate price grid points for item i at location l. Candidate grid points satisfy the ending rules and the minimum price change requirement. The term $P_{gp}$ is the price corresponding to a candidate grid point in the set. Finally, the term $X_{gp}$ is an integer variable with value 1 if the candidate grid point $P_{gp}$ is selected, or a value of 0 otherwise. Also, one and only one grid point is selected from the candidate grid points for an (item, location) pair. This is expressed as follows:

$$\sum_{gp \in GP_{il}} X_{gp} = 1$$

The MILP formulation also makes use of constraints to determine deviations from the optimal solution of the nonlinear optimization problem. These constraints may be expressed as in the following equation:

$$p_{il} + slackP_{il} - surplusP_{il} = p_{il}^*$$

wherein $slackP_{il}$ denotes the variable representing slack in reaching the optimal price from the nonlinear optimization problem formulation. The term $surplusP_{il}$ denotes the variable representing surplus beyond the optimal price from the nonlinear optimization problem formulation.

Finally, the MILP formulation may make use of objective terms, including those used in the nonlinear optimization problem formulation, except the maximization terms and target penalties. Thus, the MILP may consider all penalty terms used in satisfying pricing rules. The MILP formulation also uses an additional penalty term, which represents a penalty for deviating from the optimal NLP prices, and which may be expressed as:

$$\sum_{il} \omega_{slackP_{il}} * slackP_{il} + \sum_{il} \omega_{surplusP_{il}} * surplusP_{il}$$

wherein the sum of penalty terms, which captures the deviations from the optimal nonlinear optimization problem formulation prices, is to be minimized.

Figure 8:
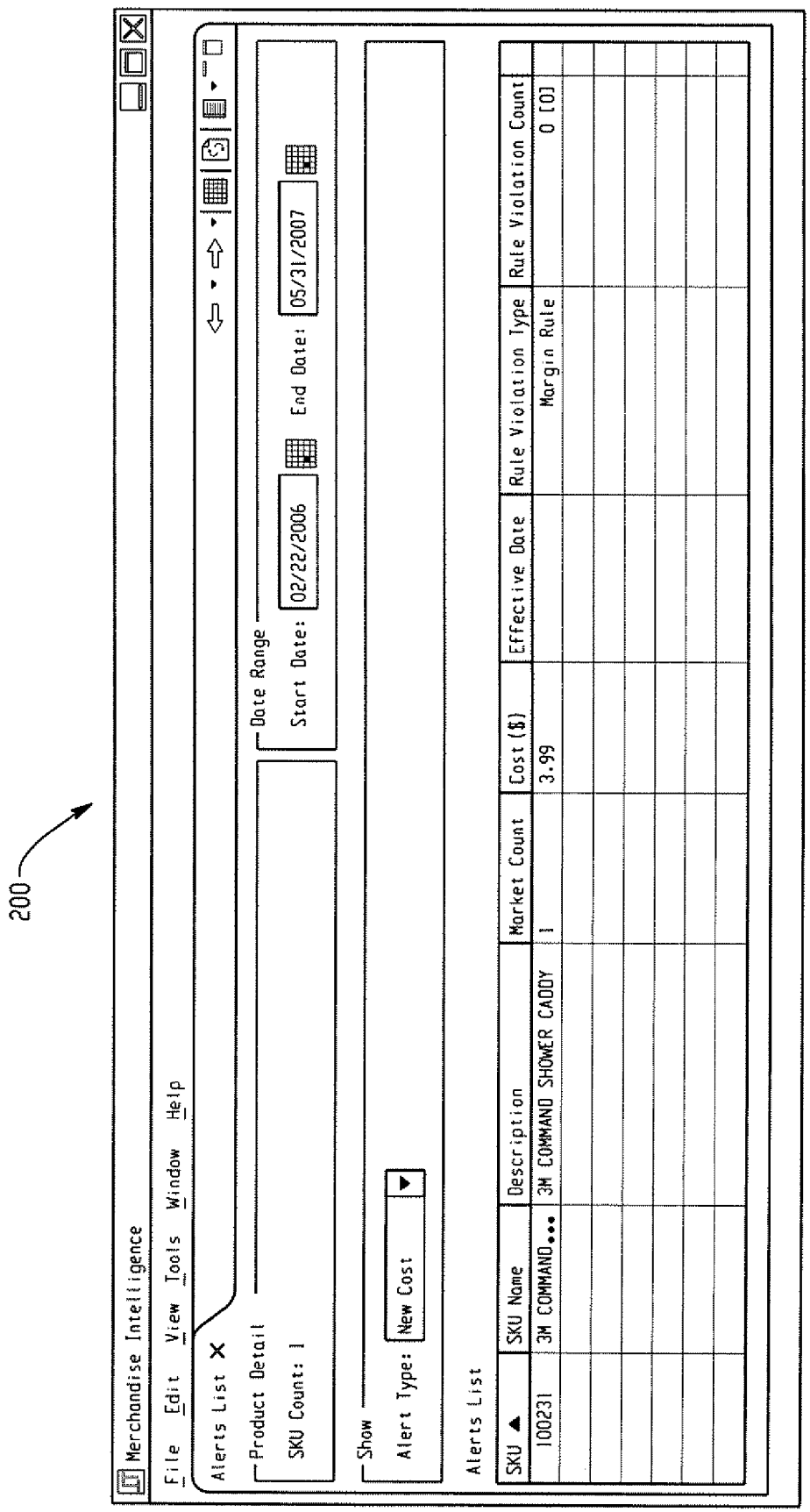

FIGS. 8-18 are graphical user interfaces that depict an example of interaction between a user and a regular price optimization system. FIG. 8 shows at 200 a screen through which a user inputs data items that are important in this example for deciding how price should change. Through the interface 200, the user can review the recent changes in costs of items and competitive prices. Costs of items are used in the calculations involving margin constraints, margin targets, and margin objectives. More specifically, the system uses these data items as indicators to tell the system when a computed solution is non-optimal in some way. It is through the inputting of these new data items that the user can indicate to the system the boundaries within which the optimization process must operate. As an example, the user has set a margin rule as a rule violation type.

Figure 9:
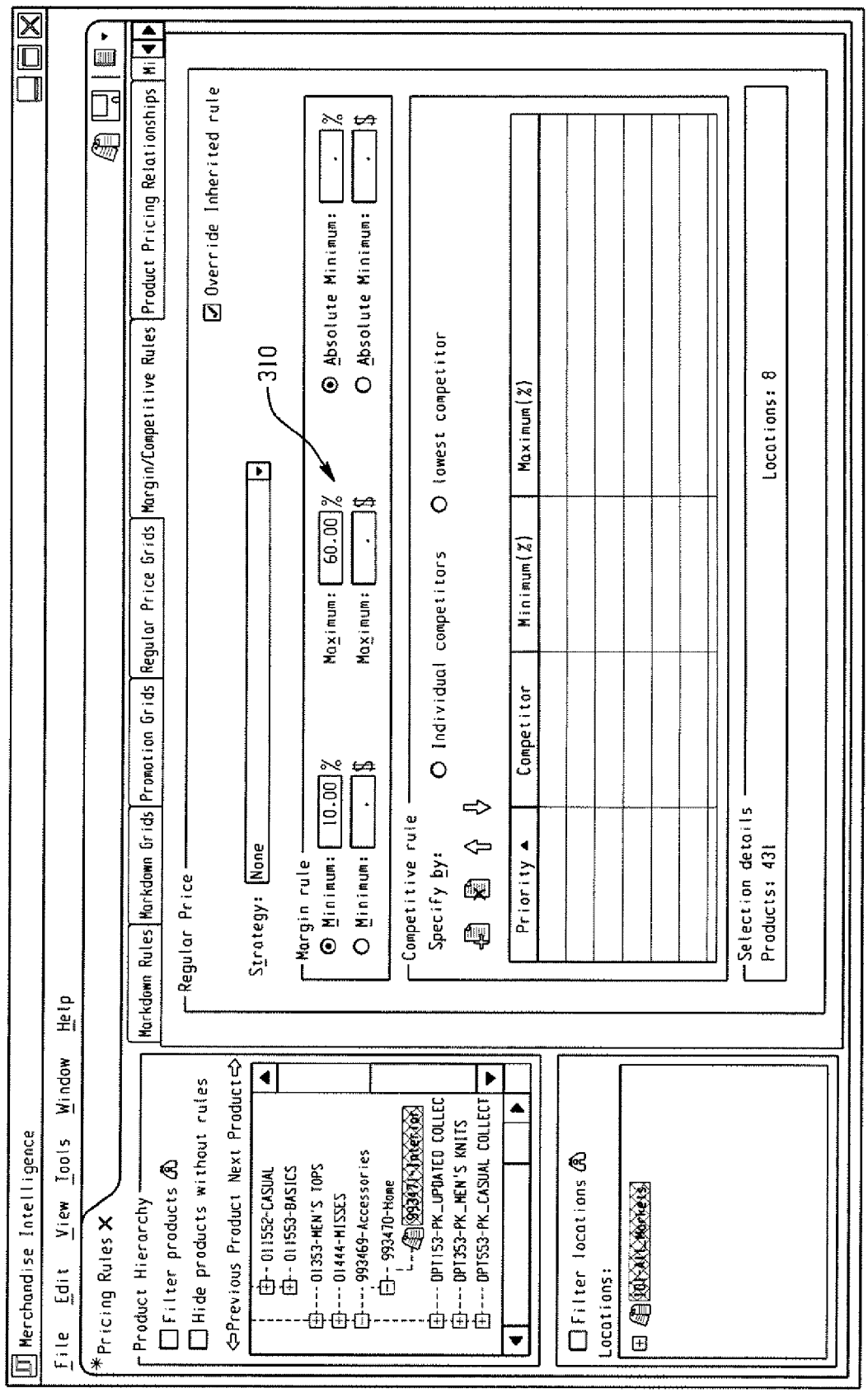
Figure 10:
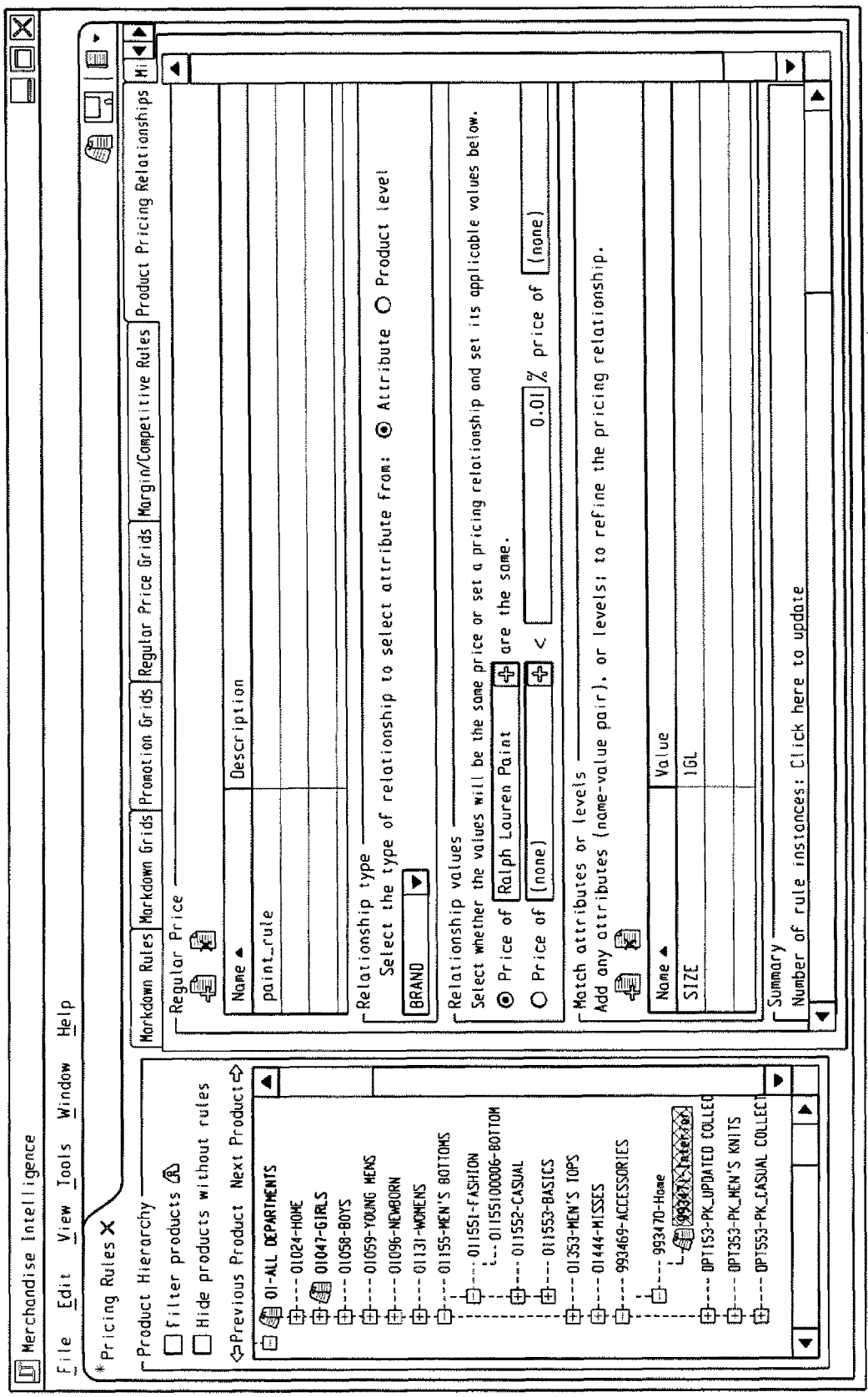

With reference to FIG. 9, the user through interface 300 sets at 310 the margin rule to show a range of percent margin for a specified set of items and locations. With reference to FIG. 10, the user through interface 400 sets a rule indicating that all items of a specified brand (e.g. Ralph Lauren) and size (e.g. 1 Gallon) should be priced the same. This is an example of an item relationship rule constraining price of an item in view of the price of other items, e.g., prices need to be same or price of one item need to at least 50% more than the price of another item.

Figure 11:
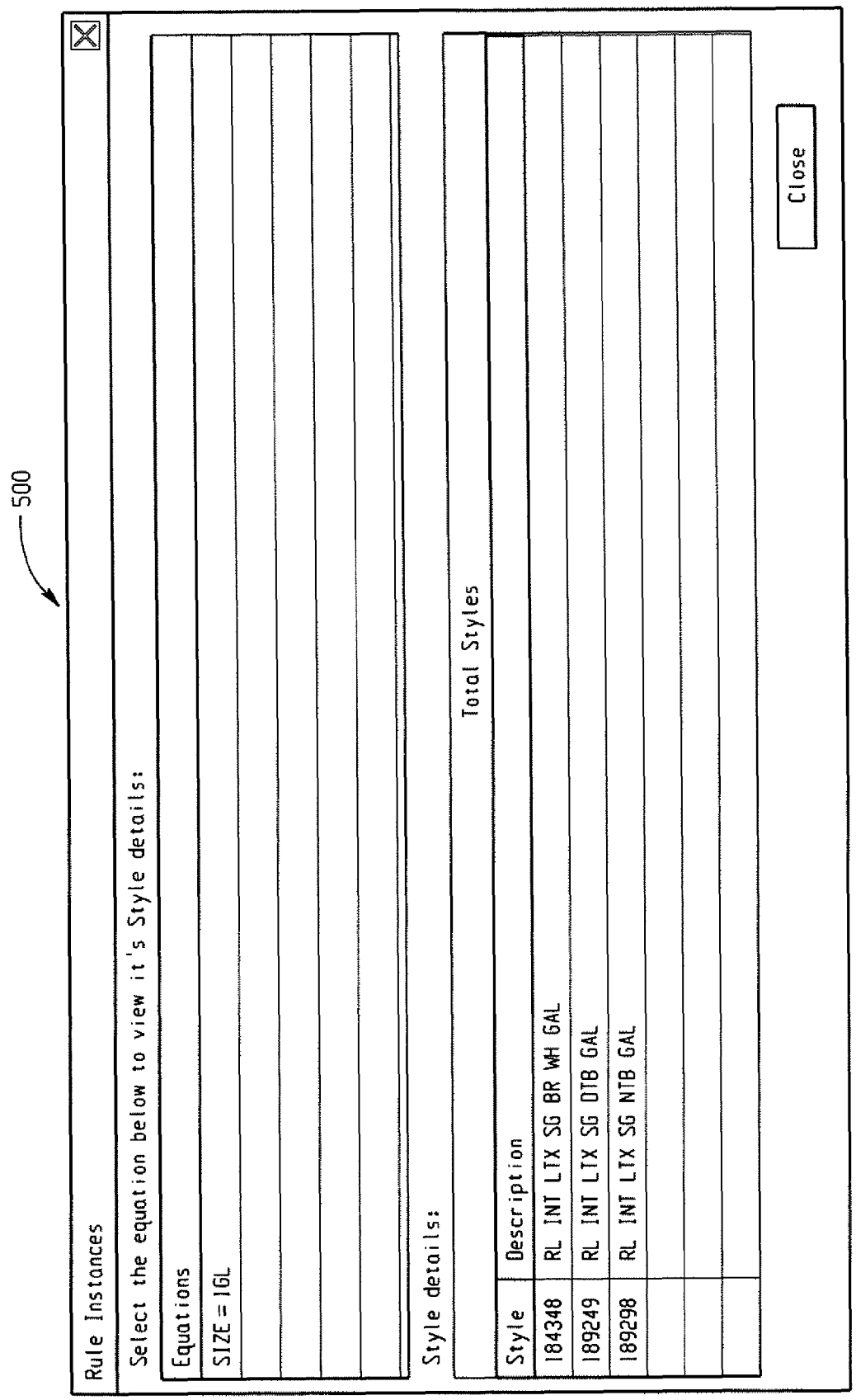
Figure 12:
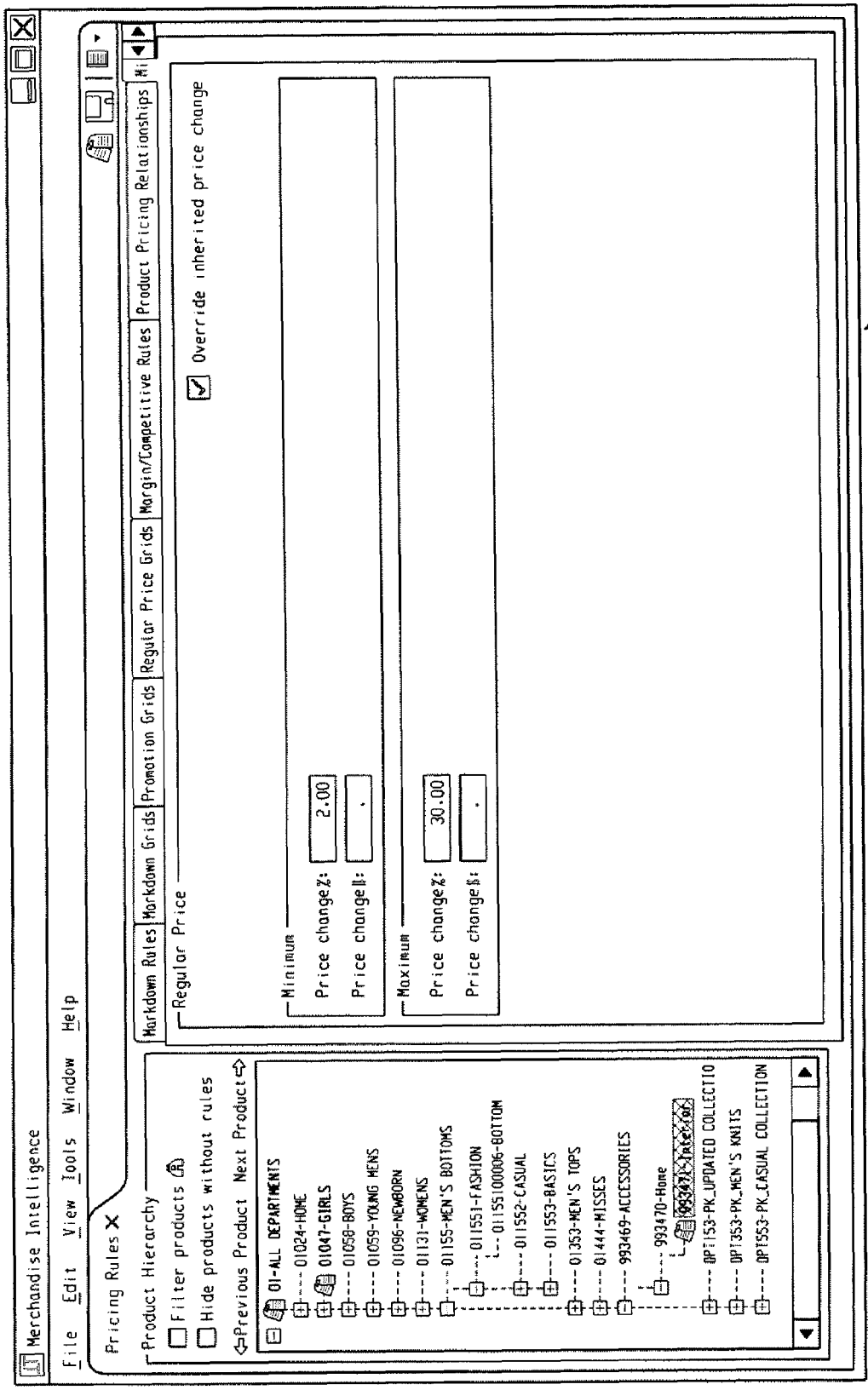
Figure 13:
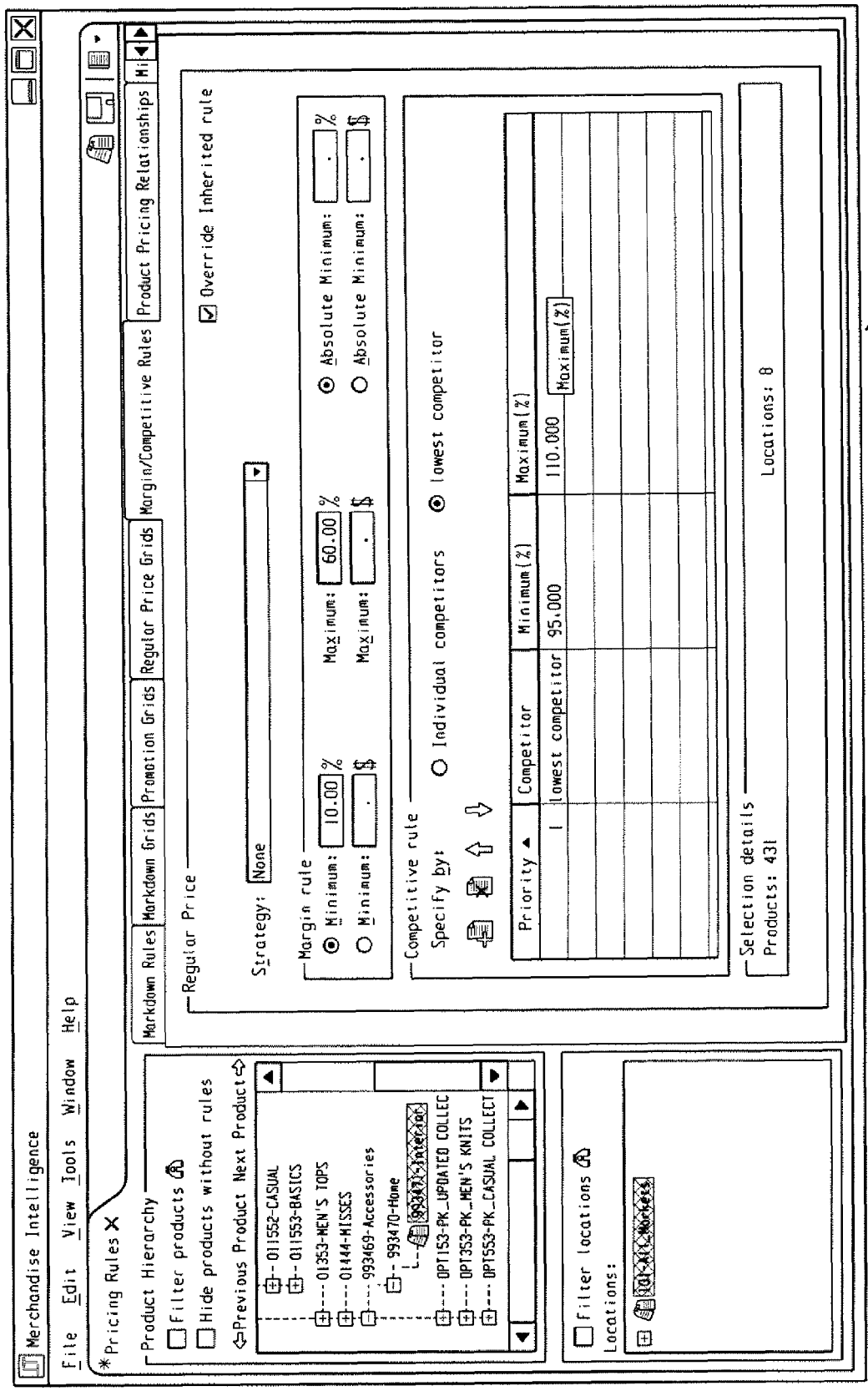
Figure 14:
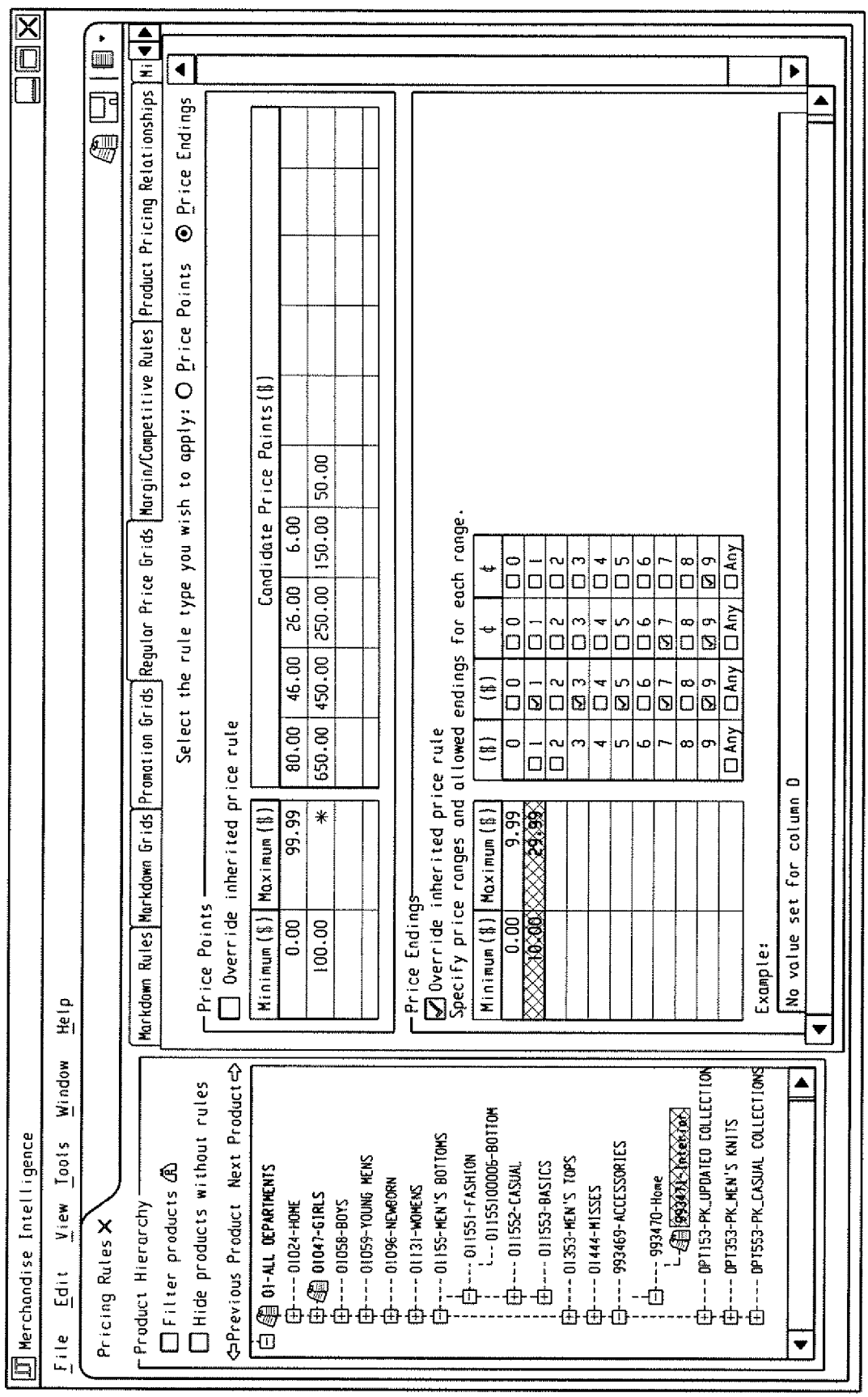
Figure 15:
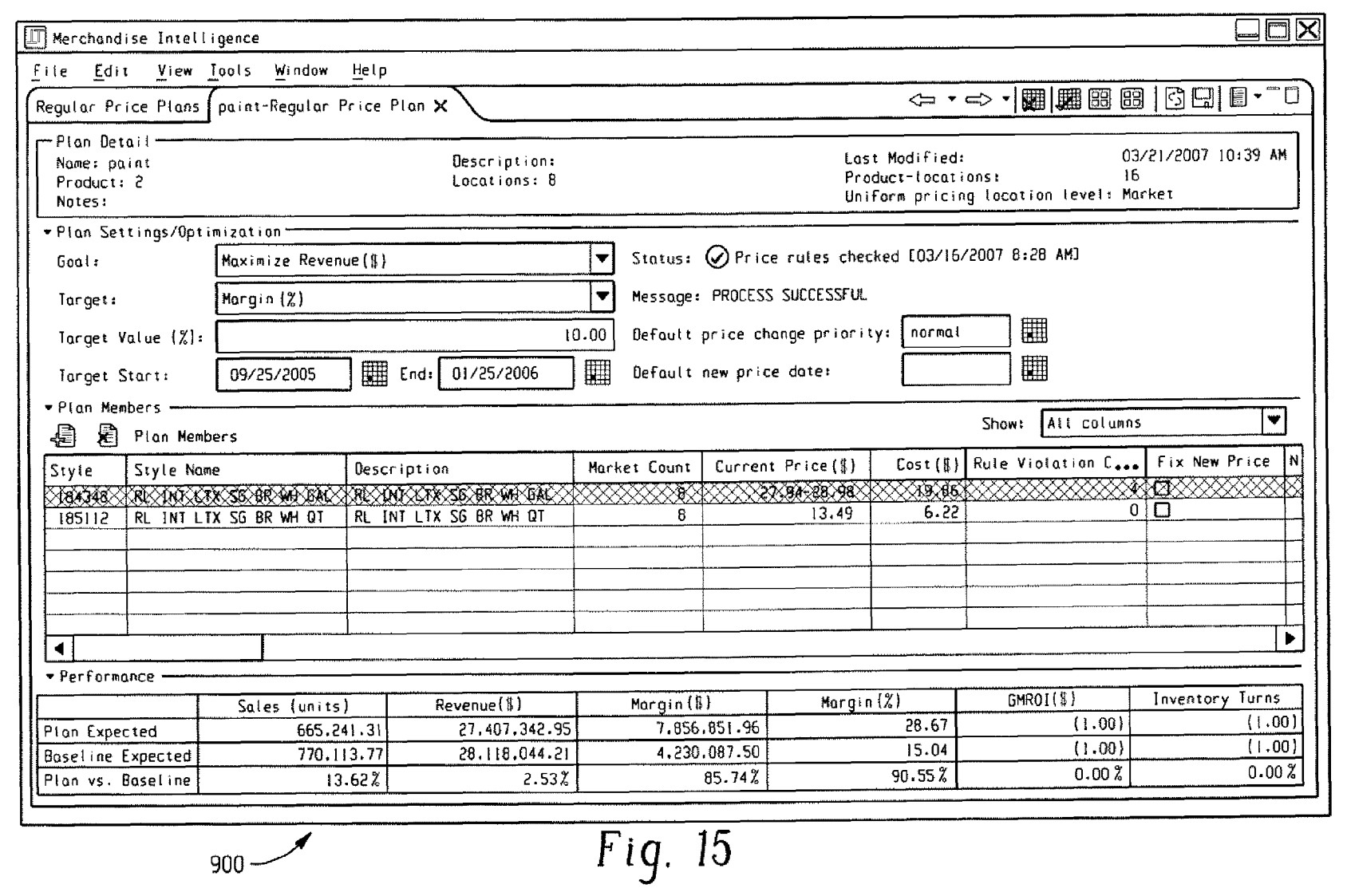

FIG. 11 depicts an interface 500 showing items that are to be priced the same due to the item relationship rule specified in the previous screen. FIG. 12 depicts an interface 600 showing a rule that specifies minimum and maximum allowed changes in prices of items from the current price. FIG. 13 depicts an interface 700 wherein a user has set a competitive rule for a range of acceptable price variation from the lowest competitive price. The competitive rule specifies a desired price range given the price offered by a competitor. FIG. 14 depicts an interface 800 wherein a price grid has been based on acceptable price points and ending-digit rules. FIG. 15 depicts an interface 900 showing initial values of prices and rule violations for selected items. User can examine the prices and rules violations at current price settings. This assists the user in determining the need for changing prices.

Figure 16:
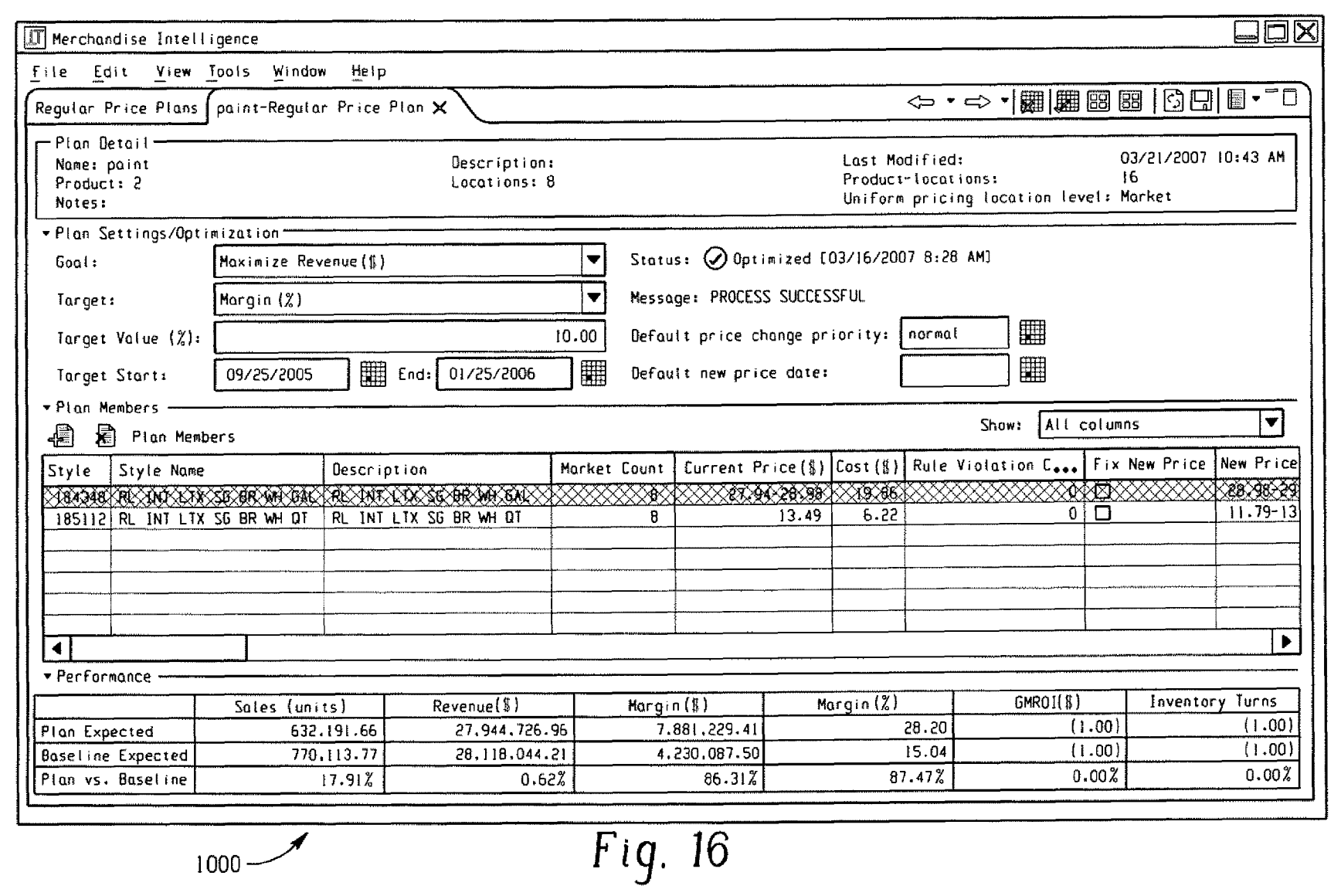

FIG. 16 depicts an interface 1000 after the optimization has been performed. The optimization has minimized the rule violations and maximized the selected objective. More specifically, interface 1000 shows the updated values of prices and rule violation information resulting from the optimization.

Figure 17:
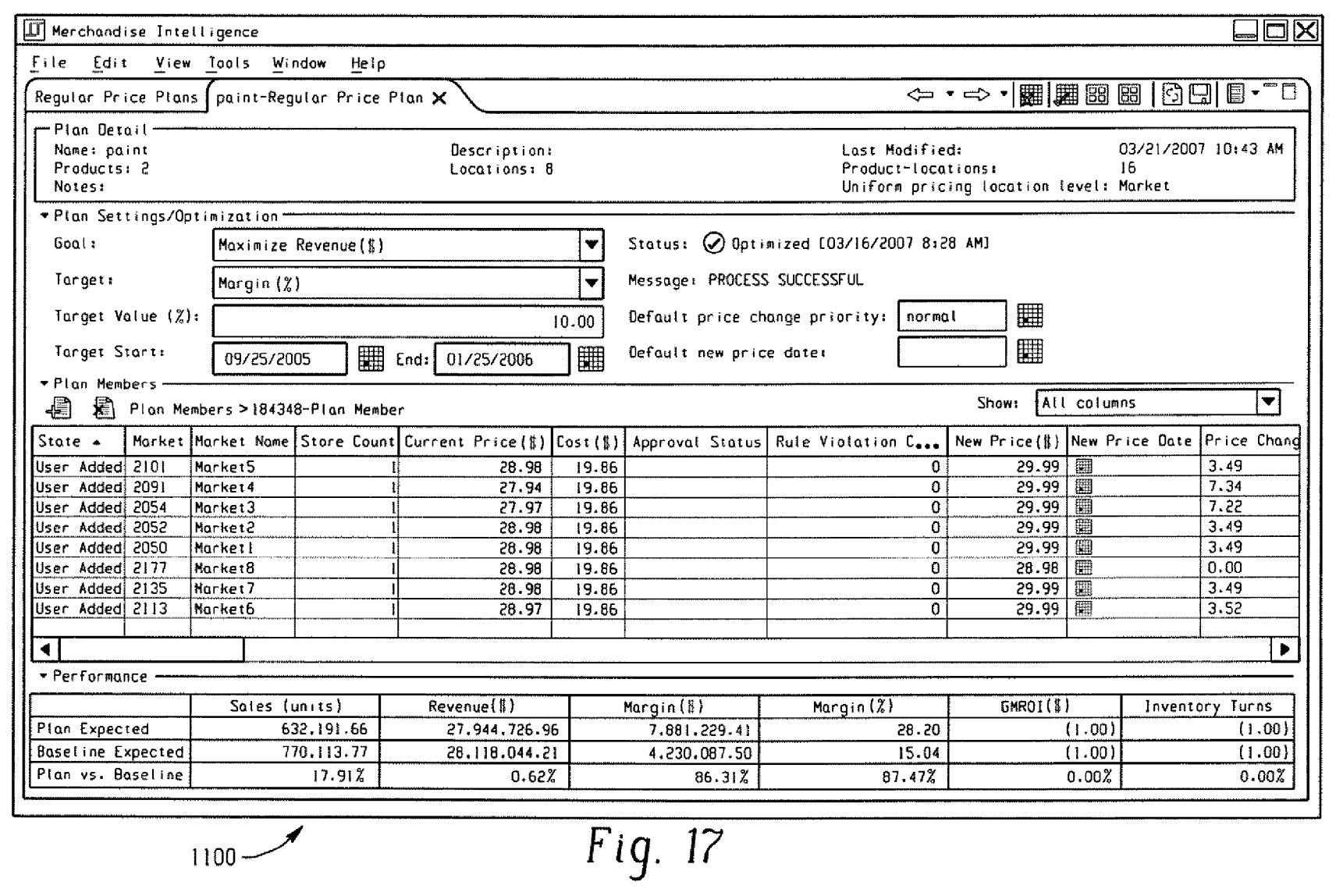

FIG. 17 depicts an interface 1100 showing a detailed view of optimized prices by items and locations. The user can use the interface 1100 to review the optimal price change recommendations from the optimization algorithm and determine whether other changes may be needed for another iteration of regular price optimization.

FIG. 18 depicts an interface 1200 showing a detailed view of the optimization that occurred. For example, interface 1200 shows updated values of prices and rule violations for items that are related to the selected items by pricing rules and cross effects of prices. (As opposed to these changes, other changes are direct effect of changes in costs or competitive prices.)

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, a system and method can be configured as disclosed herein to address many different situations such as the cannibalization effect situation, the halo effect situation, and/or interactions among items due to rules. An example of the cannibalization effect is as follows: item A responds well to price drop; however, promoting it cannibalizes the demand of item B which is a high margin item. An example of the halo effect is as follows: item C does not respond well to price drop; however, promoting it has a halo effect on the demand of item D which is a high margin item. An example of interactions among items due to rules is as follows: item A responds well to price drop; however, it results in a drop in price of E due to a rule relating A to E and E does not respond well to price drop.

Figure 19:
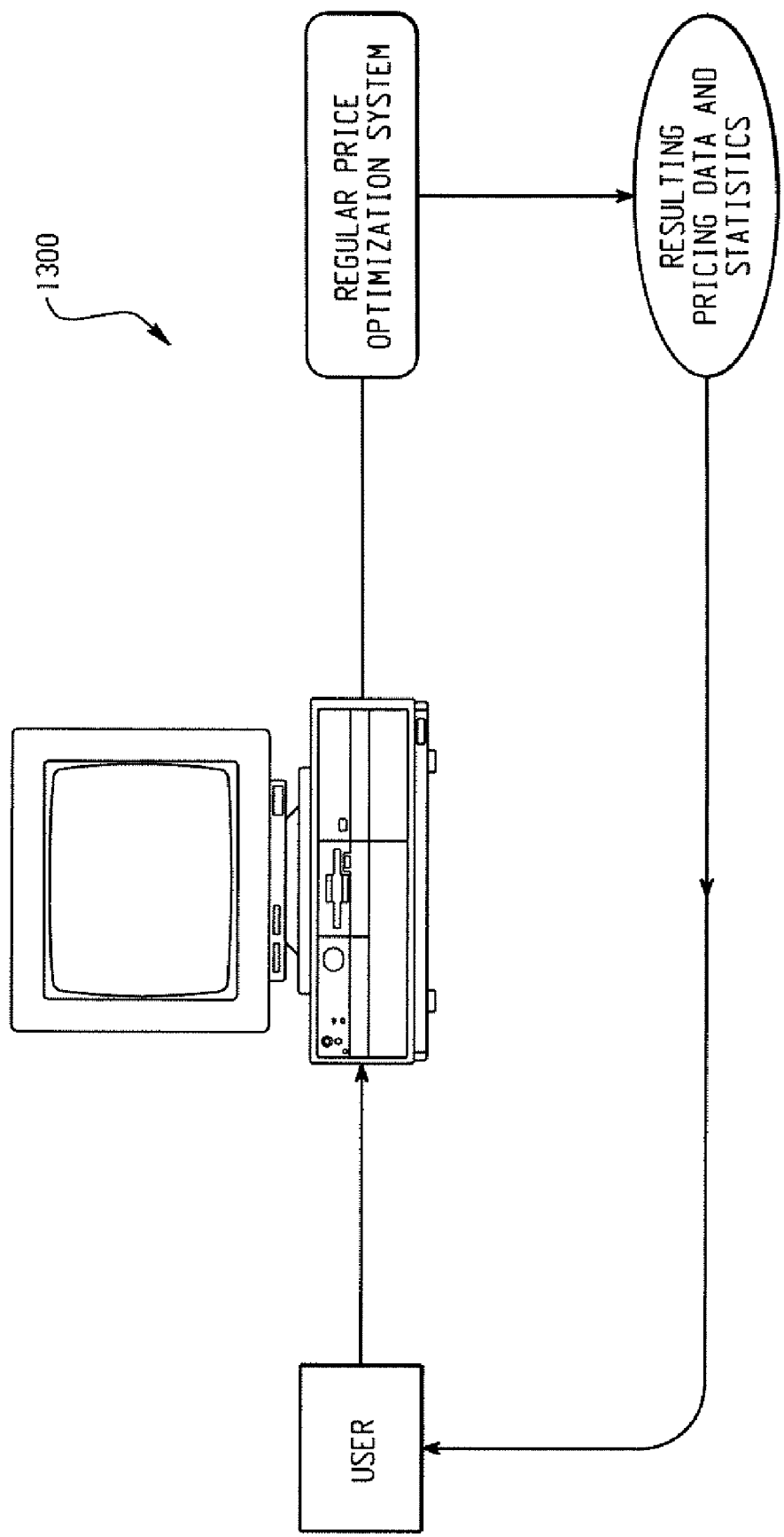
FIG. 19 is a block diagram depicting a stand-alone environment wherein users can interact with a regular price optimization system.

As another illustration, the systems and methods may be implemented on various types of computer architectures, such as for example on a single general purpose computer or workstation (e.g., as shown at 1300 on FIG. 19), or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for determining regular prices, comprising:
    receiving, using one or more data processors, data about items to be priced, wherein each item has an integer pricing requirement;
    using, using the one or more data processors, the received data to form one or more sub-problem item groups, wherein each sub-problem item group is formed based upon one or more pre-determined sub-problem grouping criteria, and wherein each sub-problem item group includes the received data corresponding to one or more items within that sub-problem group;
    optimizing, using the one or more data processors, an objective function using a non-linear optimization program, one or more pre-selected business constraints, and the data corresponding to one or more items within a sub-problem group, wherein the non-linear optimization program ignores any of the integer pricing requirements when optimizing the objective function;
    using, using the one or more data processors, the optimized objective function to attempt to generate one or more target item prices for the sub-problem item group, wherein when the one or more target item prices are not generated using the optimized objective function, successive runs of a linear optimization program are used to generate the one or more target item prices; and
    determining, using the one or more data processors, one or more regular prices for the sub-problem item group using a mixed integer linear program, wherein determining includes minimizing one or more distances associated with the one or more target item prices.

2. The method of claim 1, wherein a regular price for an item is a price of the item when the item is not discounted during a promotion or clearance.

3. The method of claim 1, wherein the plurality of items includes goods available at a store.

4. The method of claim 1, wherein data is received for greater than ten thousand items.

5. The method of claim 4, wherein the items are associated with multiple stores.

6. The method of claim 1, wherein the objective function is maximized with respect to revenue or margin.

7. The method of claim 1, wherein the sub-problem grouping criteria includes grouping items that are related by cross price effects or by relationship.

8. The method of claim 7, wherein the relationship is a brand or size relationship.

9. The method of claim 1, wherein the business constraints include a lower bound for a regular price.

10. The method of claim 1, wherein the business constraints include a range for a regular price.

11. The method of claim 1, wherein the business constraints include a range for a regular price, and wherein the range is based upon a cost for an item.

12. The method of claim 1, wherein the business constraints include a range for a regular price, and wherein the range is based upon a current price for an item.

13. The method of claim 1, wherein the business constraints include one or more pre-selected end-digit rules.

14. The method of claim 13, wherein the one or more preselected end-digit rules include constraining a regular price to end in a value of nine.

15. The method of claim 1, wherein the business constraints include one or more linear equality constraints or linear inequality constraints.

16. The method of claim 1, wherein the successive runs of the linear optimization program are used when the optimized objective function is non-linear requiring excessive computing time.

17. A computer-implemented system for determining regular prices, comprising:
one or more processors;
one or more computer-readable storage mediums containing instructions configured to cause the one or more processors to perform operations including:
receiving data about items to be priced, wherein each item has an integer pricing requirement;
using the received data to form one or more sub-problem item groups, wherein each sub-problem item group is formed based upon one or more pre-determined sub-problem grouping criteria, and wherein each sub-problem item group includes the received data corresponding to one or more items within that sub-problem group;
optimizing an objective function using a non-linear optimization program, one or more pre-selected business constraints, and the data corresponding to one or more items within a sub-problem group, wherein the non-linear optimization program ignores any of the integer pricing requirements when optimizing the objective function;
using the optimized objective function to attempt to generate one or more target item prices for the sub-problem item group, wherein when the one or more target item prices are not generated using the optimized objective function, successive runs of a linear optimization program are used to generate the one or more target item prices; and
determining one or more regular prices for the sub-problem item group using a mixed integer linear program, wherein determining includes minimizing one or more distances associated with the one or more target item prices.

18. A non-transitory computer-program product, tangibly embodied in a machine-readable storage medium, including instructions configured to cause a data processing apparatus to:
receive data about items to be priced, wherein each item has an integer pricing requirement;
use the received data to form one or more sub-problem item groups, wherein each sub-problem item group is formed based upon one or more pre-determined sub-problem grouping criteria, and wherein each sub-problem item group includes the received data corresponding to one or more items within that sub-problem group;
optimize an objective function using a non-linear optimization program, one or more pre-selected business constraints, and the data corresponding to one or more items within a sub-problem group, wherein the non-linear optimization program ignores any of the integer pricing requirements when optimizing the objective function;
use the optimized objective function to attempt to generate one or more target item prices for the sub-problem item group, wherein when the one or more target item prices are not generated using the optimized objective function, successive runs of a linear optimization program are used to generate the one or more target item prices; and
determine one or more regular prices for the sub-problem item group using a mixed integer linear program, wherein determining includes minimizing one or more distances associated with the one or more target item prices.

* * * * *